US012719724B2

(12) United States Patent
Chang et al.

(10) Patent No.: US 12,719,724 B2
(45) Date of Patent: Aug. 25, 2026

(54) METHOD AND DEVICE FOR TRANSMITTING/RECEIVING WIRELESS SIGNAL IN COMMUNICATION SYSTEM

(71) Applicant: ELECTRONICS AND TELECOMMUNICATIONS RESEARCH INSTITUTE, Daejeon (KR)

(72) Inventors: Kapseok Chang, Daejeon (KR); Won Cheol Cho, Daejeon (KR); Byung Jae Kwak, Daejeon (KR); Young-Jo Ko, Daejeon (KR); Yong Sun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 131 days.

(21) Appl. No.: 18/720,365

(22) PCT Filed: Dec. 16, 2022

(86) PCT No.: PCT/KR2022/020656
§ 371 (c)(1),
(2) Date: Jun. 14, 2024

(87) PCT Pub. No.: WO2023/113567
PCT Pub. Date: Jun. 22, 2023

(65) Prior Publication Data

US 2025/0158856 A1 May 15, 2025

(30) Foreign Application Priority Data

Dec. 16, 2021 (KR) ........................ 10-2021-0181110

(51) Int. Cl.
*H04L 27/20* (2006.01)
*H04L 27/26* (2006.01)

(52) U.S. Cl.
CPC .......... *H04L 27/20* (2013.01); *H04L 27/2627* (2013.01)

(58) Field of Classification Search
CPC ..... H04L 27/20; H04L 27/36; H04L 27/2626; H04L 27/2627; H04L 27/2613; H04J 11/0076; H04J 11/0079; H04J 11/0069
See application file for complete search history.

(56) References Cited

U.S. PATENT DOCUMENTS 8,705,658 B2 4/2014 Seo et al.
10,044,542 B2 * 8/2018 Lee .................... H04L 27/2613
(Continued)

FOREIGN PATENT DOCUMENTS

JP 5694478 B2 4/2015
KR 10-2010-003771 A 1/2010
KR 10-2010-0081691 A 7/2010

OTHER PUBLICATIONS

"3rd Generation Partnership Project; Technical Specification Group Radio Access Network; NR; Physical channels and modulation (Release 16)", 3GPP TS 38.211 V16.7.0 (Sep. 2021).

*Primary Examiner* — Betsy Deppe
(74) *Attorney, Agent, or Firm* — Rabin & Berdo, P.C.

(57) ABSTRACT

A method for operating a first communication node, in one embodiment of a communication system, comprises the steps of: generating a first binary sequence and a second binary sequence; generating, on the basis of the first and second binary sequences and a BPSK operation, a first intermediate sequence having 2N elements; generating, on the basis of an operation on the elements of the first intermediate sequence, a first signal sequence including N elements; mapping, to N subcarriers, first modulation symbols generated by modulating the first signal sequence; and transmitting a first signal including the mapped first modulation symbols, wherein the first and second binary (Continued)

sequences are generated on the basis of generator polynomials of which the maximum order is p+1, wherein p is a natural number and N can be a natural number having a value of $(2^P-1)$.

20 Claims, 11 Drawing Sheets

(56) References Cited

U.S. PATENT DOCUMENTS

| | | | |
|---|---|---|---|
| 11,140,646 | B2 | 10/2021 | Chang et al. |
| 2010/0150577 | A1 | 6/2010 | Essiambre et al. |
| 2013/0022017 | A1 | 1/2013 | Han et al. |
| 2013/0259013 | A1 | 10/2013 | Malladi et al. |
| 2016/0218821 | A1 | 7/2016 | Adhikary et al. |
| 2019/0097856 | A1 | 3/2019 | Kim et al. |
| 2020/0162299 | A1 * | 5/2020 | Kim .................... H04L 27/2613 |
| 2020/0383074 | A1 | 12/2020 | Chang et al. |

* cited by examiner 100
110-1
110-2
110-3
120-1
120-2
130-1
130-2
130-3
130-4
130-5
130-6

620
-1
1
Re
BPSK
630
Im
Re
$\frac{1}{\sqrt{2}}$
$-\frac{1}{\sqrt{2}}$
$j\frac{1}{\sqrt{2}}$
$-j\frac{1}{\sqrt{2}}$
π/4 QPSK

METHOD AND DEVICE FOR TRANSMITTING/RECEIVING WIRELESS SIGNAL IN COMMUNICATION SYSTEM

TECHNICAL FIELD

The present disclosure relates to a radio signal transmission and reception technique in a communication system, and more particularly, to a technique for improving radio signal transmission and reception performance in a communication system.

BACKGROUND ART

With the development of information and communication technology, various wireless communication technologies are being developed. Representative wireless communication technologies include long term evolution (LTE) and new radio (NR) defined as the 3rd generation partnership project (3GPP) standards. The LTE may be one of 4th generation (4G) wireless communication technologies, and the NR may be one of 5th generation (5G) wireless communication technologies. A wireless communication technology after the 5G wireless communication technology (e.g., the sixth generation (6G) wireless communication technology, etc.) may be referred to as 'beyond-5G (B5G) wireless communication technology'.

In an exemplary embodiment of a communication system, in order to access a radio network, a user may perform serving cell identification after acquiring time/frequency synchronization with the network. The serving cell identification may be performed, for example, through physical cell identity (PCI) estimation using a predetermined synchronization signal. Each cell may have a different PCI and may transmit a synchronization signal including information for identifying the PCI (i.e., synchronization signal indicating the PCI). For an easy cell identification operation, cross-correlation characteristics between synchronization signals indicating different PCIs may need to be excellent, and variability of cross-correlation characteristics of all possible synchronization signal pairs may need to be low.

Meanwhile, the number of distinguishable PCIs may be limited according to a synchronization signal design scheme. In order to overcome this limitation and increase the number of distinguishable PCIs, in an exemplary embodiment of the communication system, a scheme of generating linearly distinct synchronization signals by cyclically shifting cyclically distinct sequences may be used. The sequences generated through cyclic shifting as described above may not follow the cross-correlation characteristics of the original sequences. Due to this, cross-correlation characteristics between the generated synchronization signal pairs may be deteriorated, and variability of the cross-correlation characteristics may increase. A technique capable of effectively increasing the number of distinct PCIs while maintaining cross-correlation characteristics of synchronization signals and their variability may be required.

Matters described as the prior arts are prepared to help understanding of the background of the present disclosure, and may include matters that are not already known to those of ordinary skill in the technology domain to which exemplary embodiments of the present disclosure belong.

DISCLOSURE

Technical Problem

An objective of the present disclosure for achieving the above-described demand is to provide a method and an apparatus for signal transmission and reception that can improve performance of radio signal-based cell identification operations in a communication system.

Technical Solution

An operation method of a first communication node, according to an exemplary embodiment of the present disclosure for achieving the above-described objective, may comprise: generating first and second binary sequences composed of 2N elements; generating a first intermediate sequence composed of 2N elements based on the first and second binary sequences and a binary phase shift keying (BPSK) operation; generating a first signal sequence composed of N elements based on an operation on the 2N elements constituting the first intermediate sequence; mapping first modulation symbols generated by modulating the first signal sequence to N subcarriers; and transmitting a first signal composed of the mapped first modulation symbols, wherein the first and second binary sequences are generated based on generator polynomials having a maximum degree of (p+1) and a first identifier for the first communication node, p is a natural number, and N is a natural number having a value of $(2^P-1)$.

The generating of the first intermediate sequence may comprise: generating first and second cyclic shift indexes based on the first identifier; applying the first cyclic shift index to the first binary sequence; applying the second cyclic shift index to the second binary sequence; performing the BPSK operation on a sum of the first and second binary sequences to which the first and second cyclic shift indexes are applied; and obtaining the first intermediate sequence corresponding to a result of the BPSK operation.

The generating of the first signal sequence may comprise: multiplying 2k-th elements among the 2N elements constituting the first intermediate sequence by a first coefficient that is a real number; multiplying (2k+1)-th elements among the 2N elements constituting the first intermediate sequence by a second coefficient that is a pure imaginary number; performing a sum operation on the 2k-th elements multiplied by the first coefficient and the (2k+1)-th elements multiplied by the second coefficient; and obtaining k-th elements of the first signal sequence based on a result of the sum operation, wherein k is an integer equal to or greater than 0 and less than N.

The generating of the first signal sequence may comprise: multiplying 2k-th elements among the 2N elements constituting the first intermediate sequence by a first coefficient that is a real number; multiplying (2k+1)-th elements among the 2N elements constituting the first intermediate sequence by a second coefficient that is a pure imaginary number; performing a sum operation on the 2k-th elements multiplied by the first coefficient and the (2k+1)-th elements multiplied by the second coefficient; performing a rotation transformation operation on a result of the sum operation at a first angle on a complex plane; and obtaining k-th elements of the first signal sequence based on a result of the rotation transformation operation, wherein k is an integer equal to or greater than 0 and less than N.

The first angle may be one of $\pi/4$, $-\pi/4$, $3\pi/4$, or $-3\pi/4$.

The first signal may support up to $(2N+1)^2$ distinct values for the first identifier.

An operation method of a first communication node, according to an exemplary embodiment of the present disclosure for achieving the above-described objective, may comprise: generating first and second binary sequences composed of (N/2) elements, and a third binary sequence composed of M elements; generating a first intermediate sequence composed of (N/2) elements based on the first to third binary sequences and a binary phase shift keying (BPSK) operation; generating first and second element groups each composed of (N/2) elements based on the first intermediate sequence; generating a first signal sequence composed of N elements based on the first and second element groups; mapping first modulation symbols generated by modulating the first signal sequence to N subcarriers; and transmitting a first signal composed of the mapped first modulation symbols, wherein the first and second binary sequences are generated based on generator polynomials having a maximum degree of (p−1), first to third cyclic shift indexes determined based on a first identifier for the first communication node are applied to the first to third binary sequences, respectively, p is a natural number, N is a natural number having a value of $(2^P-2)$, and M is a natural number less than or equal to (N/2).

The generating of the first intermediate sequence may comprise: determining the first to third cyclic shift indexes based on the first identifier; applying the first cyclic shift index to the first binary sequence; applying the second cyclic shift index to the second binary sequence; applying the third cyclic shift index to the third binary sequence; performing the BPSK operation on a sum of the first to third binary sequences to which the first to third cyclic shift indexes are applied; and obtaining the first intermediate sequence corresponding to a result of the BPSK operation.

The determining of the first to third cyclic shift indexes may comprise: determining a first variable g based on a value of the first identifier; determining a second variable Ω based on a number of possible values of the first identifier; and determining the first to third cyclic shift indexes based on the first variable g, the second variable Ω, a first reference value t, and one or more modulo operations, wherein g, Ω, and t are natural numbers.

The second cyclic shift index may be determined based on a t-modulo operation and a Ω-modulo operation for the first variable g.

The first signal may support up to (M×N×N) distinct values for the first identifier.

The (N/2) elements constituting the first element group may be represented as k-th elements, the (N/2) elements constituting the second element group may be represented as (N/2+k)-th elements, and the generating of the first and second element groups may comprise: obtaining the k-th elements of the first element group based on k-th elements among the (N/2) elements constituting the first intermediate sequence; and obtaining the (N/2+k)-th elements of the second element group based on k-th elements among the (N/2) elements constituting the first intermediate sequence, wherein the N elements constituting the first signal sequence include the (N/2) elements constituting the first element group and the (N/2) elements constituting the second element group, and k is an integer greater than or equal to 0 and less than (N/2).

The (N/2) elements constituting the first element group may be represented as (N/2−1−k)-th elements, the (N/2) elements constituting the second element group may be represented as (N/2+k)-th elements, and the generating of the first and second element groups may comprise: obtaining the (N/2−1−k)-th elements of the first element group based on k-th elements among the (N/2) elements constituting the first intermediate sequence; and obtaining the (N/2+k)-th elements of the second element group based on the k-th elements among the (N/2) elements constituting the first intermediate sequence, wherein the N elements constituting the first signal sequence include the (N/2) elements constituting the first element group and the (N/2) elements constituting the second element group, and k is an integer greater than or equal to 0 and less than (N/2).

The first modulation symbols mapped to the N subcarriers may form a centrally symmetrical structure around a first reference subcarrier of the N subcarriers.

The first signal may have only real components in time domain.

A first communication node according to an exemplary embodiment of the present disclosure for achieving the above-described objective may comprise a processor, and the processor may cause the first communication node to perform: generating first and second binary sequences composed of (N/2) elements, and a third binary sequence composed of M elements; generating a first intermediate sequence composed of (N/2) elements based on the first to third binary sequences and a binary phase shift keying (BPSK) operation; generating first and second element groups each composed of (N/2) elements based on the first intermediate sequence; generating a first signal sequence composed of N elements based on the first and second element groups; mapping first modulation symbols generated by modulating the first signal sequence to N subcarriers; and transmitting a first signal composed of the mapped first modulation symbols, wherein the first and second binary sequences are generated based on generator polynomials having a maximum degree of (p−1), first to third cyclic shift indexes determined based on a first identifier for the first communication node are applied to the first to third binary sequences, respectively, p is a natural number, N is a natural number having a value of $(2^P-2)$, and M is a natural number less than or equal to (N/2).

In the generating of the first intermediate sequence, the processor may further cause the first communication node to perform: determining the first to third cyclic shift indexes based on the first identifier; applying the first cyclic shift index to the first binary sequence; applying the second cyclic shift index to the second binary sequence; applying the third cyclic shift index to the third binary sequence; performing the BPSK operation on a sum of the first to third binary sequences to which the first to third cyclic shift indexes are applied; and obtaining the first intermediate sequence corresponding to a result of the BPSK operation.

In the determining of the first to third cyclic shift indexes, the processor may further cause the first communication node to perform: determining a first variable g based on a value of the first identifier; determining a second variable Ω based on a number of possible values of the first identifier; and determining the first to third cyclic shift indexes based on the first variable g, the second variable Ω, a first reference value t, and one or more modulo operations, wherein g, Ω, and t are natural numbers.

The second cyclic shift index may be determined based on a t-modulo operation and a Ω-modulo operation for the first variable g.

The first signal may support up to (M×N×N) distinct values for the first identifier.

Advantageous Effects

According to an exemplary embodiment of a method and an apparatus for radio signal transmission and reception in a communication system, performance of an estimation operation or identification operation based on a radio signal transmitted and received between a transmitting node and a receiving node can be improved. The radio signal according to an exemplary embodiment of the method and apparatus for radio signal transmission and reception in the communication system can support classification of more identification indexes while using the same amount of frequency resource. Using the radio signal according to an exemplary embodiment of the method and apparatus for radio signal transmission and reception in the communication system, computational complexity for the estimation operation or identification operation can be reduced. The radio signal according to an exemplary embodiment of the method and apparatus for radio signal transmission and reception in the communication system can have lower transmission complexity while using the same amount of frequency resource.

MODE FOR INVENTION

Figure 1:
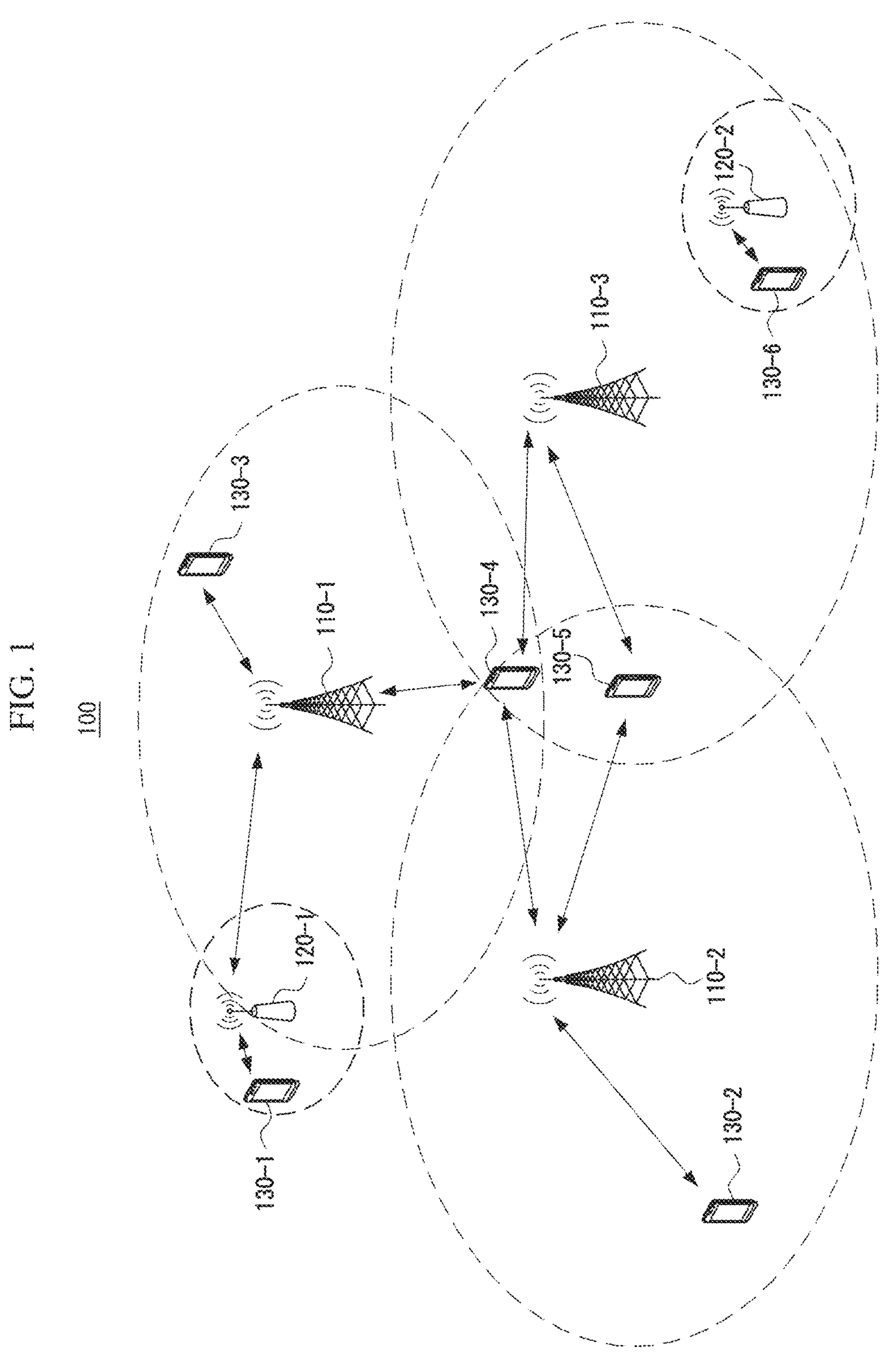
FIG. 1 is a conceptual diagram illustrating an exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Throughout the present disclosure, a network may include, for example, a wireless Internet such as wireless fidelity (WiFi), mobile Internet such as a wireless broadband Internet (WiBro) or a world interoperability for microwave access (WiMax), 2G mobile communication network such as a global system for mobile communication (GSM) or a code division multiple access (CDMA), 3G mobile communication network such as a wideband code division multiple access (WCDMA) or a CDMA2000, 3.5G mobile communication network such as a high speed downlink packet access (HSDPA) or a high speed uplink packet access (HSUPA), 4G mobile communication network such as a long term evolution (LTE) network or an LTE-Advanced network, 5G mobile communication network, or the like.

Throughout the present disclosure, a terminal may refer to a mobile station, mobile terminal, subscriber station, portable subscriber station, user equipment, access terminal, or the like, and may include all or a part of functions of the terminal, mobile station, mobile terminal, subscriber station, mobile subscriber station, user equipment, access terminal, or the like.

Here, a desktop computer, laptop computer, tablet PC, wireless phone, mobile phone, smart phone, smart watch, smart glass, e-book reader, portable multimedia player (PMP), portable game console, navigation device, digital camera, digital multimedia broadcasting (DMB) player, digital audio recorder, digital audio player, digital picture recorder, digital picture player, digital video recorder, digital video player, or the like having communication capability may be used as the terminal.

Throughout the present disclosure, the base station may refer to an access point, radio access station, node B (NB), evolved node B (eNB), base transceiver station, mobile multihop relay (MMR)-BS, or the like, and may include all or part of functions of the base station, access point, radio access station, NB, eNB, base transceiver station, MMR-BS, or the like.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support 4th generation (4G) communication (e.g., long term evolution (LTE), LTE-advanced (LTE-A)), 5th generation (5G) communication (e.g., new radio (NR)), or the like. The 4G communication may be performed in a frequency band of 6 gigahertz (GHz) or below, and the 5G communication may be performed in a frequency band of 6 GHz or above.

For example, for the 4G and 5G communications, the plurality of communication nodes may support a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, a filtered OFDM based communication protocol, a cyclic prefix OFDM (CP-OFDM) based communication protocol, a discrete Fourier transform spread OFDM (DFT-s-OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, a generalized frequency division multiplexing (GFDM) based communication protocol, a filter bank multi-carrier (FBMC) based communication protocol, a universal filtered multi-carrier (UFMC) based communication protocol, a space division multiple access (SDMA) based communication protocol, or the like.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like.

Meanwhile, each of the plurality of communication nodes 110-1, 110-2, 110-3, 120-1, 120-2, 130-1, 130-2, 130-3, 130-4, 130-5, and 130-6 constituting the communication system 100 may have the following structure.

Figure 2:
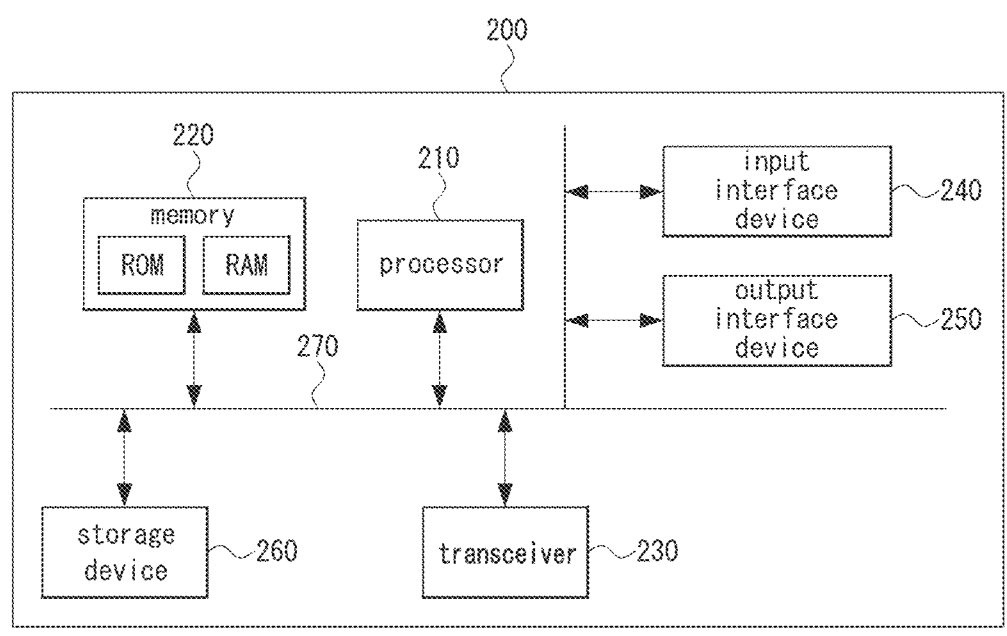
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. The communication system 100 including the base stations 110-1, 110-2, 110-3, 120-1, and 120-2 and the terminals 130-1, 130-2, 130-3, 130-4, 130-5, and 130-6 may be referred to as an 'access network'. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, a road side unit (RSU), a radio remote head (RRH), a transmission point (TP), a transmission and reception point (TRP), an eNB, a gNB, or the like.

Here, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, an Internet of things (IoT) device, a mounted apparatus (e.g., a mounted module/device/terminal or an on-board device/terminal, etc.), or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

In addition, each of the plurality of base stations 110-1, 110-2, 110-3, 120-1, and 120-2 may support multi-input multi-output (MIMO) transmission (e.g., a single-user MIMO (SU-MIMO), multi-user MIMO (MU-MIMO), massive MIMO, or the like), coordinated multipoint (COMP) transmission, carrier aggregation (CA) transmission, transmission in an unlicensed band, device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2, and operations supported by the plurality of base stations 110-1, 110-2, 110-3, 120-1, and 120-2. For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the COMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, radio signal transmission and reception methods in a communication system will be described. Even when a method (e.g., transmission or reception of a data packet) performed at a first communication node among communication nodes is described, the corresponding second communication node may perform a method (e.g., reception or transmission of the data packet) corresponding to the method performed at the first communication node. That is, when an operation of a receiving node is described, a corresponding transmitting node may perform an operation corresponding to the operation of the receiving node. Conversely, when an operation of a transmitting node is described, a corresponding receiving node may perform an operation corresponding to the operation of the transmitting node.

Figure 3:
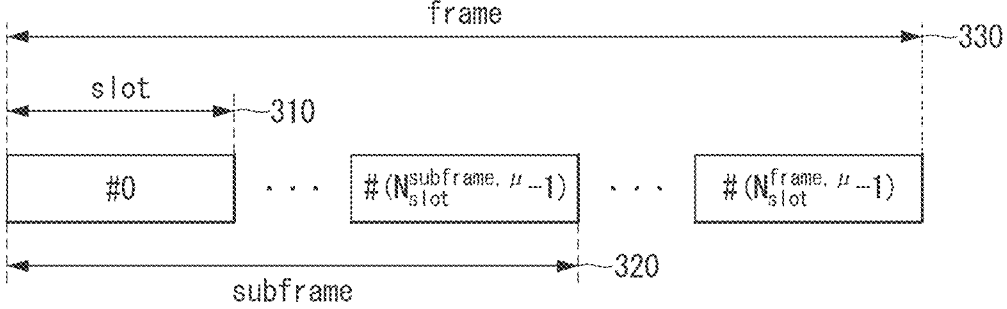
FIG. 3 is a conceptual diagram illustrating an exemplary embodiment of a structure of a radio frame in a communication system.

FIG. 3 is a conceptual diagram illustrating an exemplary embodiment of a structure of a radio frame in a communication system.

Referring to FIG. 3, in the communication system, one radio frame may consist of 10 subframes, and one subframe may consist of 2 time slots. One time slot may have a plurality of symbols in the time domain and may include a plurality of subcarriers in the frequency domain. The plurality of symbols in the time domain may be OFDM symbols. For convenience, an exemplary embodiment of a radio frame structure in the communication system will be described below using an OFDM transmission mode in which the plurality of symbols in the time domain are OFDM symbols as an example. However, this is only an example for convenience of description, and exemplary embodiments of the radio frame structure in the communication system are not limited thereto. For example, various exemplary embodiments of the radio frame structure in the communication system may be configured to support other transmission modes, such as a single carrier (SC) transmission mode.

In a communication system to which the 5G communication technology, etc. is applied, one or more of numerologies of Table 1 may be used in accordance with various purposes, such as inter-carrier interference (ICI) reduction according to frequency band characteristics, latency reduction according to service characteristics, and the like.

TABLE 1

| μ | $\Delta f = 2^{\mu} \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

Table 1 is only an example for convenience of description, and exemplary embodiments of numerologies used in the communication system may not be limited thereto. Each numerology μ may correspond to information of a subcarrier spacing (SCS) Δf and a cyclic prefix (CP). The terminal may identify values of the numerology u and CP applied to a downlink bandwidth part or uplink bandwidth part based on higher layer parameters such as 'subcarrierSpacing' and 'cyclicPrefix'.

Time resources in which radio signals are transmitted in a communication system 300 may be represented with a frame 320 comprising one or more $$\left(N_{slot}^{frame,\mu} / N_{slot}^{subframe,\mu}\right)$$

subframes, a subframe 320 comprising one or more $$\left(N_{slot}^{subframe,\mu}\right)$$

slots, and a slot 310 comprising 14

$$\left(N_{symb}^{slot}\right)$$

OFDM symbols. In this case, according to a configured numerology, as the values of $$N_{symb,}^{slot}, N_{slot}^{subframe,\mu}, \text{ and } N_{slot}^{frame,\mu},$$

values according to Table 2 below may be used in case of a normal CP, and values according to Table 3 below may be used in case of an extended CP. The OFDM symbols included within one slot may be classified into 'downlink', 'flexible', or 'uplink' by higher layer signaling or a combination of higher layer signaling and L1 signaling.

TABLE 2

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\mu}$ | $N_{slot}^{subframe,\mu}$ |
|---|---|---|---|
| 2 | 12 | 40 | 4 |

In an exemplary embodiment of a communication system, the frame 330 may have a length of 10 ms, and the subframe 320 may have a length of 1 ms. Each frame 330 may be divided into two half-frames having the same length, and the first half-frame (i.e., half-frame 0) may be composed of subframes #0 to #4, and the second half-frame (i.e., half-frame 1) may be composed of subframes #5 to #9. One carrier may include a set of frames for uplink (i.e., uplink frames) and a set of frames for downlink (i.e., downlink frames).

One slot may have 6 (i.e., extended cyclic prefix (CP) case) or 7 (i.e., normal CP case) OFDM symbols. A time-frequency region defined by one slot may be referred to as a resource block (RB). When one slot has 7 OFDM symbols, one subframe may have 14 OFDM symbols (i.e., 1=0, 1, 2, . . . , 13).

The subframe may be divided into a control region and a data region. A physical downlink control channel (PDCCH) may be allocated to the control region. A physical downlink shared channel (PDSCH) may be allocated to the data region.

Some of the subframes may be special subframes. The special subframe may include a downlink pilot time slot (DwPTS), a guard period (GP), and an uplink pilot time slot (UpPTS). The DwPTS may be used for time and frequency synchronization estimation and cell search of the terminal. The GP may be a period for avoiding interferences caused by multipath delays of downlink signals.

In an exemplary embodiment of a communication system, in order to access a radio network, a user may perform serving cell identification after acquiring time/frequency synchronization with the network. The serving cell identification may be performed, for example, through physical cell identity (PCI) estimation using a predetermined synchronization signal. Each cell may have a different PCI and may transmit a synchronization signal including information for identifying the PCI (i.e., synchronization signal indicating the PCI). For an easy cell identification operation, cross-correlation characteristics between synchronization signals indicating different PCIs may need to be excellent, and variability of cross-correlation characteristics of all possible synchronization signal pairs may need to be low.

Meanwhile, the number of distinguishable PCIs may be limited according to a synchronization signal design scheme. In order to overcome this limitation and increase the number of distinguishable PCIs, in an exemplary embodiment of the communication system, a scheme of generating linearly distinct synchronization signals by cyclically shifting cyclically distinct sequences may be used. The sequences generated through cyclic shifting as described above may not follow the cross-correlation characteristics of the original sequences. Due to this, cross-correlation characteristics between the generated synchronization signal pairs may be deteriorated, and variability of the cross-correlation characteristics may increase. A technique capable of effectively increasing the number of distinct PCIs while maintaining cross-correlation characteristics of synchronization signals and their variability may be required.

In an exemplary embodiment of the communication system, a synchronization signal may be configured based on one or more sequences. The one or more sequences constituting the synchronization signal may be arranged in the frame 330, subframe 320, slot 310, or OFDM symbols constituting the slot 310 in the time domain. Meanwhile, the one or more sequences constituting the synchronization signal may be modulated and mapped to a plurality of subcarriers in the frequency domain. In an exemplary embodiment of the communication system, the one or more sequences constituting the synchronization signal may correspond to one or more binary sequences or complex sequences.

Figure 4:
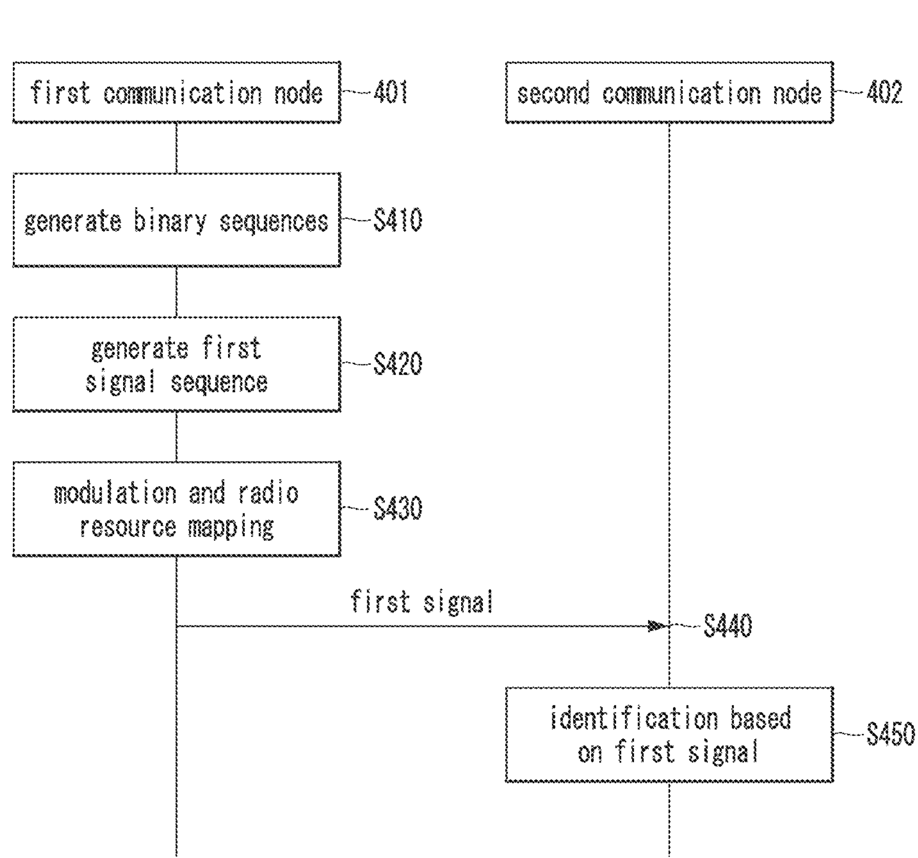
FIG. 4 is a sequence chart for describing a first exemplary embodiment of a signal transmission and reception method in a communication system.

FIG. 4 is a sequence chart for describing a first exemplary embodiment of a signal transmission and reception method in a communication system.

Referring to FIG. 4, a communication system 400 may include a plurality of communication nodes. For example, the communication system 400 may include at least a first communication node 401 and a second communication node 402. The first communication node 401 may be the same as or similar to the cell transmitting a synchronization signal described with reference to FIG. 3. The second communication node 402 may be the same as or similar to the receiving node for receiving the synchronization signal described with reference to FIG. 3. Hereinafter, in describing the exemplary embodiment of the signal transmission and reception method in the communication system with reference to FIG. 4, descriptions overlapping those described with reference to FIGS. 1 to 3 may be omitted.

In an exemplary embodiment of the communication system 400, the first communication node 401 may correspond to a cell, base station, network, or the like. The first communication node 401 may transmit a first signal including identification information to be used for users (e.g., UE, terminals, etc.) within a coverage of the first communication node 401 to identify the first communication node 401. For example, the first communication node 401 may be identified by first identification information. The first identification information may correspond to a physical cell identity (PCI). Alternatively, the first identification information may correspond to information on the PCI. The first identification information may be generated based on the PCI. The first signal including the first identification information may correspond to a synchronization signal. However, this is only an example for convenience of description, and the first exemplary embodiment of the signal transmission and reception method in the communication system 400 is not limited thereto. The first signal may be composed of one or more sequences (hereinafter, one or more first signal sequences). The second communication node 402 may receive the first signal transmitted from the first communication node 401. The second communication node 402 may perform identification for the first communication node 401 based on the received first signal.

Specifically, the first communication node 401 may generate one or more binary sequences (S410). The one or more binary sequences may correspond to PN sequences. The PN sequence may be referred to as 'm-sequence'. The first communication node 401 may generate one or more first signal sequences based on the one or more binary sequences (S420).

The first communication node 401 may modulate the one or more first signal sequences generated in step S420 and allocate (or map) them to a radio resource (S430). For example, the first communication node 401 may modulate the one or more generated first signal sequences to generate one or more modulation symbols. The first communication node 401 may allocate the generated one or more modulation symbols onto a time resource and/or frequency resource.

The first communication node 401 may transmit the first signal composed of the one or more first signal sequences modulated and mapped to the radio resource to the second communication node 402 (S440). In other words, the first communication node 401 may transmit, to the second communication node 402, the first signal consisting of the one or more modulation symbols in which the one or more first signal sequences are modulated.

The second communication node 402 may receive the first signal transmitted from the first communication node 401 (S440). The second communication node may perform an identification operation for the first communication node 401 based on the first signal received in step S440 (S450). The identification in step S450 may include, for example, cell identification.

Figure 5A:
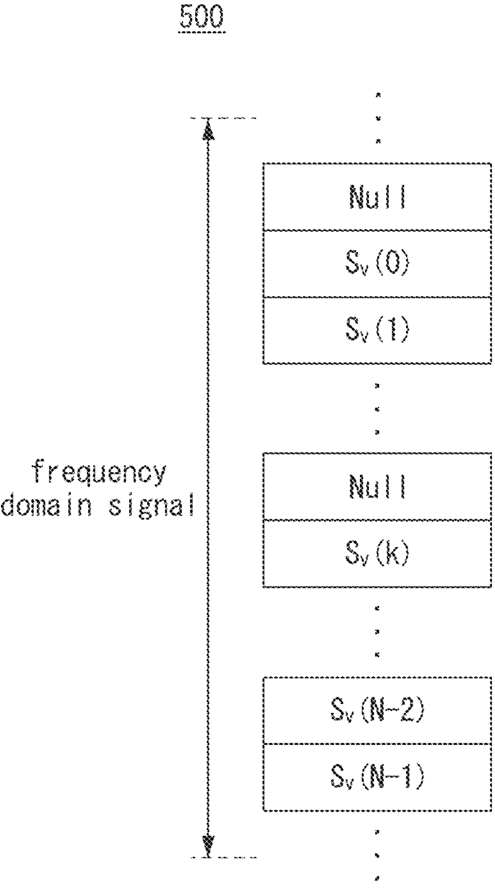
FIGS. 5A and 5B are conceptual diagrams for describing a first exemplary embodiment of a radio signal structure in a communication system.
Figure 5B:
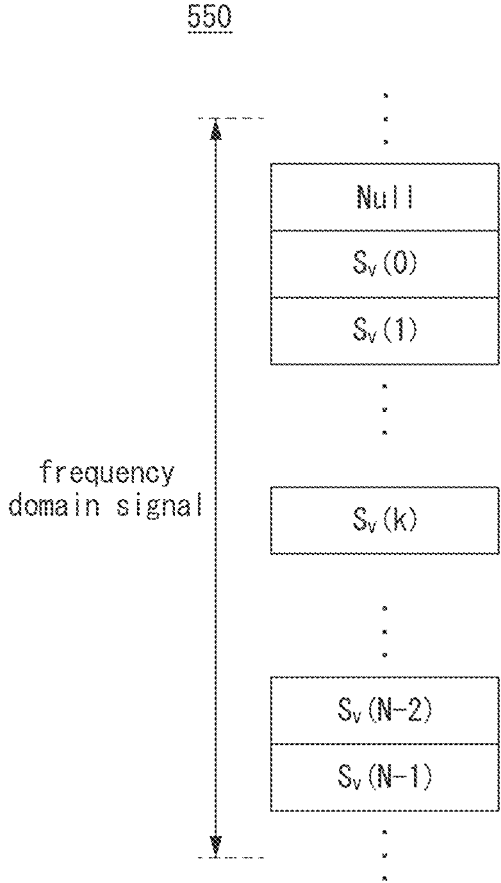

FIGS. 5A and 5B are conceptual diagrams for describing a first exemplary embodiment of a radio signal structure in a communication system.

Referring to FIGS. 5A and 5B, a communication system may include a plurality of communication nodes. The communication system may be the same as or similar to the communication system 400 described with reference to FIG. 4. Hereinafter, in describing the first exemplary embodiment of the radio signal structure in the communication system with reference to FIGS. 5A and 5B, descriptions overlapping those described with reference to FIGS. 1 to 4 may be omitted.

The first communication node may generate and transmit a radio signal to the second communication node. The first communication node may generate one or more radio signals. The first communication node may generate one or more radio signal sequences to generate the one or more radio signals. The first communication node may modulate one or more elements constituting the one or more generated radio signal sequences and map them to one or more subcarriers in the frequency domain.

In an exemplary embodiment of the communication system, when the number of one or more subcarriers to which the one or more radio signal sequences are mapped is a natural number N of 1 or more, an index k for the subcarriers may have a natural number greater than or equal to 0 and less than or equal to N−1. That is, k may be 0, 1, . . . , or N−1. The one or more radio signal sequences may be generated based on a predetermined identification index v. Here, the identification index v may correspond to, for example, the first identification information described with reference to FIG. 4. The identification index v may correspond to the first identification information. The identification index v may be determined based on the first identification information. Alternatively, the first identification information may be determined based on the identification index v. The one or more radio signal sequences may be expressed as $S_v(k)$. Alternatively, the one or more radio signal sequences may be distinguished according to a generation scheme and expressed as $S_{v,1}(k)$, $S_{v,2}(k)$, $S_{v,3}(k)$, $S_{v,4}(k)$, and the like.

In an exemplary embodiment of the communication system, the first radio signal may correspond to the first signal described with reference to FIG. 4. The first radio signal may correspond to the synchronization signal, SSS, and the like. Alternatively, the first radio signal may correspond to a signal newly defined for cell identification. The first signal may also be referred to as 'identification signal'.

In an exemplary embodiment of the communication system, the radio signal sequence $S_v(k)$ may be generated based on two binary sequences. The radio signal sequence $S_v(k)$ may be composed of N elements (i.e., $S_v(0)$, $S_v(1)$, . . . , $S_v(N-1)$). The radio signal sequence $S_v(k)$ may be modulated and mapped to N subcarriers. FIGS. 5A and 5B show a case where N is greater than 1 (i.e., case where the radio signal sequence $S_v(k)$ is modulated and mapped to a plurality of subcarriers).

However, this is only an example for convenience of description, and the first exemplary embodiment of the radio signal structure in the communication system is not limited thereto.

Referring to FIG. 5A, in a first radio signal structure 500, the radio signal sequence $S_v(k)$ may be modulated and mapped to N subcarriers represented by an index k (k=0, 1, . . . , N−1). The N elements ($S_v(0)$, $S_v(1)$, . . . , $S_v(N-1)$) constituting the radio signal sequence $S_v(k)$ may be mapped to subcarriers having corresponding indexes, respectively. Here, N subcarriers to which the radio signal sequence $S_v(k)$ is mapped (i.e., N subcarriers to which modulation symbols obtained by modulating the radio signal sequence $S_v(k)$ are mapped) may be included in a first subcarrier group. The N subcarriers constituting the first subcarrier group may be adjacent to or spaced apart from each other in the frequency domain. FIG. 5A shows a case in which at least some of the N subcarriers constituting the first subcarrier group are arranged adjacent to each other, but this is only an example for convenience of description and the first exemplary embodiment of the radio signal structure in the communication system is not limited thereto. For example, the first subcarrier group may be composed of N subcarriers spaced apart from each other. In other words, the first subcarrier group may be composed of N subcarriers that are not adjacent to each other.

One or more null subcarriers may be arranged around or between the N subcarriers constituting the first subcarrier group. Signals may not be loaded on the null subcarrier. In other words, modulation symbols may not be allocated to the null subcarriers. The null subcarrier may have a value of 0. The null subcarrier may correspond to a gap subcarrier, a direct current (DC) subcarrier, or the like. The null subcarriers may be arranged to easily identify the respective subcarriers.

The null subcarrier may be arranged at a front end and/or rear end of the first subcarrier group in the frequency domain. For example, the null subcarrier may be arranged at a front end of a subcarrier corresponding to the subcarrier index 0 and/or at a rear end of a subcarrier corresponding to the subcarrier index N−1. In addition, one or more null subcarriers may be arranged between the N subcarriers constituting the first subcarrier group. For example, the null subcarrier may be arranged at a front end and/or a rear end of one or more central subcarriers (hereinafter referred to as 'center subcarriers') among the N subcarriers constituting the first subcarrier group. Alternatively, the first subcarrier group may be divided into a plurality of subgroups each including one or more subcarriers. The null subcarriers may be arranged at a front end and/or rear end of each subgroup.

Referring to FIG. 5B, in a second radio signal structure 550, the radio signal sequence $S_v$ (k) may be modulated and mapped to N subcarriers represented by an index k (k=0, 1, . . . , N−1). Here, the N subcarriers to which the radio signal sequence $S_v$ (k) is mapped may be included in a second subcarrier group. The second subcarrier group may include N subcarriers, at least some of which are adjacent to each other in the frequency domain. Here, null subcarriers may not be arranged between the N subcarriers constituting the second subcarrier group.

FIGS. 6A to 6D are conceptual diagrams for describing first and second exemplary embodiments of a radio signal generation scheme in a communication system.

Figure 6A:
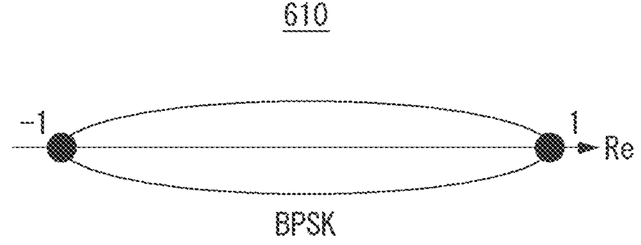
FIGS. 6A to 6D are conceptual diagrams for describing first and second exemplary embodiments of a radio signal generation scheme in a communication system.
Figure 6B:
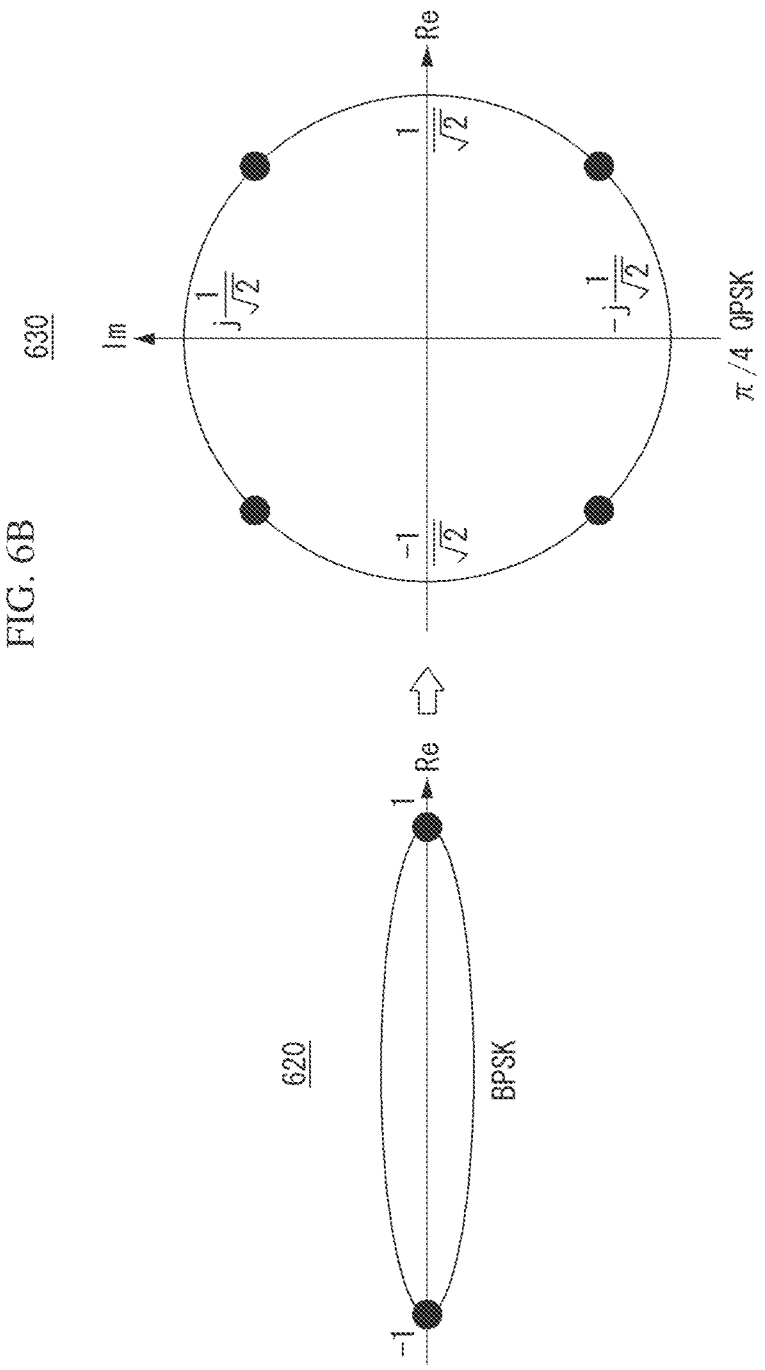

Referring to FIGS. 6A and 6B, a communication system may include a plurality of communication nodes. The communication system may be the same as or similar to the communication system 400 described with reference to FIG. 4. In the communication system, a radio signal may have a structure identical to or similar to the first radio signal structure 500 described with reference to FIG. 5A or the second radio signal structure 550 described with reference to FIG. 5B. Hereinafter, in describing the first and second exemplary embodiments of the radio signal generation scheme with reference to FIGS. 6A and 6B, description overlapping those described with reference to FIGS. 1 to 5B may be omitted.

FIG. 6A is a conceptual diagram for describing a first exemplary embodiment of a radio signal generation scheme in a communication system.

First Exemplary Embodiment of Radio Signal Generation Scheme

In an exemplary embodiment of the communication system, the first communication node may generate a radio signal according to the first exemplary embodiment of the radio signal generation scheme. The first exemplary embodiment of the radio signal generation method may be referred to as 'Binary Phase Shift Keying (BPSK) scheme'. The first exemplary embodiment of the radio signal generation scheme may be referred to as 'random BPSK scheme'.

In the first exemplary embodiment of the radio signal generation scheme, a first radio signal may be generated based on one or more basic radio signal sequences. The one or more basic radio signal sequences may be generated based on one or more binary sequences. In other words, the one or more basic radio signal sequences may correspond to a result obtained by transforming the one or more binary sequences according to the first exemplary embodiment of the radio signal generation scheme. For example, the one or more binary sequences may correspond to pseudo-noise (PN) sequences or binary PN sequences. The one or more binary sequences may correspond to m-sequences. Alternatively, the one or more binary sequences may be each configured as a gold sequence generated through an element-wise exclusive-OR (XOR) operation on two different PN sequences.

In an exemplary embodiment of the communication system, the basic radio signal sequence $S_v$ (k) may be generated based on two first binary sequences $x_0(i)$ and $x_1(i)$. For example, the basic radio signal sequence $S_v(k)$ may be defined identically or similarly to Equation 1.

[Equation 1]

$$S_v(k) = \big(1 - 2(x_0([k+v_0]_{127})\big)\big(1 - 2(x_1([k+v_1]_{127})\big),\ k = 0, 1, \ldots, N-1$$

$$x_0(i+7) = [x_0(i+4) + x_0(i+0)]_2,\ i = 0, 1, \ldots, (N-1)-7$$

$$x_1(i+7) = [x_1(i+1) + x_1(i+0)]_2,\ i = 0, 1, \ldots, (N-1)-7$$

$$[0000001] = [x_0(6)x_0(5)x_0(4)x_0(3)x_0(2)x_0(1)x_0(0)]_2$$

$$[0000001] = [x_1(6)x_1(5)x_1(4)x_1(3)x_1(2)x_1(1)x_1(0)]_2$$

$$v = 0, 1, \ldots, \Xi - 1$$

$$\Xi = 1008$$

$$g = \lfloor v/3 \rfloor,\ g_0 = \lfloor g/112 \rfloor,\ g_1 = [g]_{112},\ u = [v]_3$$

$$v_0 = 5(3g_0 + u),\ v_1 = g_1$$

$$v = 3g + u$$

In Equation 1, $[a]_b$ may refer to a b-modulo operation for a. [W] may mean the greatest integer smaller than a real number W. N may mean the number of one or more subcarriers to which the first radio signal is mapped in the frequency domain. For example, in Equation 1, N may be 127. The two first binary sequences $x_0(i)$ and $x_1(i)$ may be defined based on different generator polynomials having a maximum degree of 7. The two first binary sequences $x_0(i)$ and $x_1(i)$ may be determined based on recursive relations $x_0(i+7)=[x_0(i+4)+x_0(i+0)]_2$ and $x_1(i+7)=[x_1(i+1)+x_1(i+0)]_2$, respectively. The Ω-modulo operation of each of the recursive relations may be the same as or similar to the XOR operation. For example, the Ω-modulo operation of each of the recursive relations may correspond to an XOR operation in a Linear Feedback Shift Register (LFSR). The identification index v may be determined based on a function 'fuc(g,u)=3g+u' having g and u as input variables. Here, g may correspond to a cell group identity (CGI) and u may correspond to a physical identity (PID). The numbers shown in Equation 1 are only examples for convenience of description, and the first exemplary embodiment of the radio signal generation scheme is not limited thereto.

In Equation 1, Ξ may mean the number of distinct identification indexes v. That is, the number of values that the identification index v can have may correspond to Ξ=1008. A total of 1008 identification indexes may be identified by the basic radio signal sequence $S_v$ (k) generated according to Equation 1. However, this is only an example for convenience of description, and the first exemplary embodiment of the radio signal generation scheme is not limited thereto.

Theoretically, the maximum number of distinct identification indexes based on the basic radio signal sequence S» (k) may be defined based on a combination of all possible cyclic shift indexes of the two first binary sequences $x_0(i)$ and $x_1(i)$ constituting the basic radio signal sequence S» (k).

Each of the cyclic shift indexes $v_0$ and $v_1$ associated with the two first binary sequences $x_0(i)$ and $x_1(i)$ may have a total of 127 values. Therefore, theoretically, the maximum number of identification indexes that can be distinguished based on the basic radio signal sequence $S_v(k)$ may correspond to $127^2=16129$. The basic radio signal sequence $S_v(k)$ may have up to 127 cyclically distinct sequences.

In an exemplary embodiment of the communication system, the value of the identification index v may be selected between 0 and $\Xi-1$. When v=19 is selected, g, $g_0$, $g_1$, and u may be calculated as g=6, $g_0=0$, $g_1=6$, and u=1 based on Equation 1. In this case, the cyclic shift indexes associated with the two first binary sequences $x_0(i)$ and $x_1(i)$ may be calculated as $v_0=5$ and $v_1=6$. The basic radio signal sequence $S_v(k)$ may be calculated based on the values of the cyclic shift indexes $v_0$ and $v_1$ calculated as described above.

In Equation 1, an equation $S_v(k)=(1-2(x_0([k+v_0]_{127}))(1-2(x_1([k+v_1]_{127}))$ for calculating the basic radio signal sequence $S_v(k)$ based on the two first binary sequences $x_0(i)$ and $x_1(i)$ may correspond to a BPSK operation. The basic radio signal sequence $S_v(k)$ may have a real value of 1 or −1.

FIG. 6A shows the basic radio signal sequence $S_v(k)$ generated based on Equation 1 in the first exemplary embodiment of the radio signal generation scheme or an exemplary embodiment of a constellation map 610 (hereinafter, 'basic constellation map') generated based on the basic radio signal sequence $S_v(k)$. The first radio signal may be represented with two constellation points on the basic constellation map 610. Both of the two constellation points corresponding to the first radio signal may have a real value of 1 or −1.

Figure 6C:
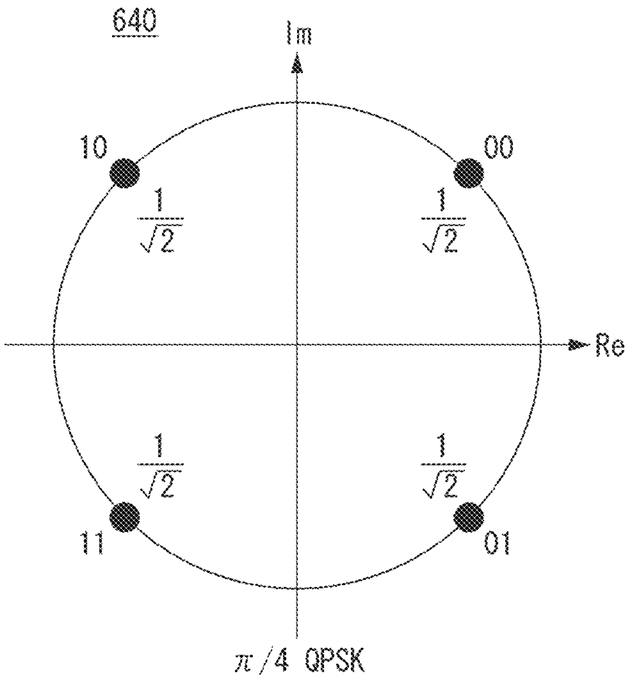
Figure 6D:
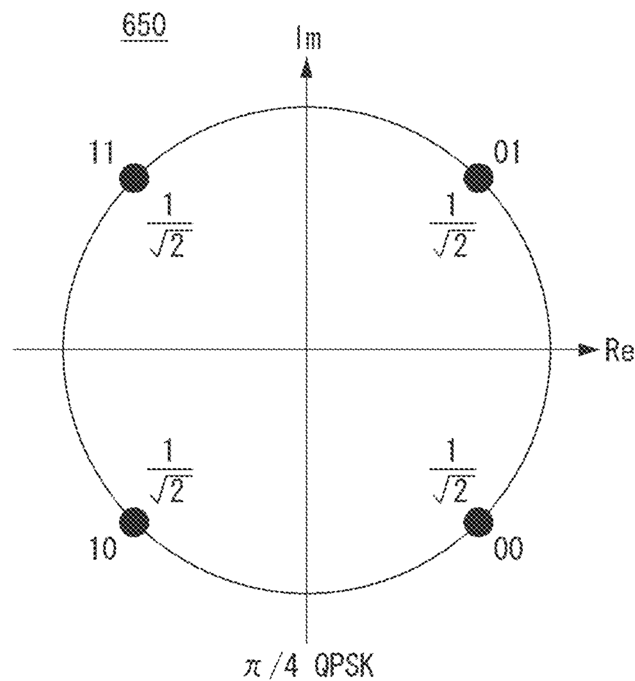

FIGS. 6B to 6D are conceptual diagrams for describing a second exemplary embodiment of a radio signal generation scheme in a communication system.

Second Exemplary Embodiment of Radio Signal Generation Scheme

In an exemplary embodiment of the communication system, the first communication node may generate a radio signal according to the second exemplary embodiment of the radio signal generation scheme. The second exemplary embodiment of the radio signal generation scheme may be referred to as 'Quadrature Phase Shift Keying (QPSK) scheme'. The second exemplary embodiment of the radio signal generation scheme may be referred to as 'random QPSK scheme'. The second exemplary embodiment of the radio signal generation scheme may be referred to as 'π/4 QPSK scheme'.

In the second exemplary embodiment of the radio signal generation scheme, a first radio signal may be generated based on one or more first radio signal sequences. The one or more first radio signal sequences may be generated based on one or more binary sequences. The one or more first radio signal sequences may be expressed as $S_{v,1}(k)$.

In an exemplary embodiment of the communication system, the first radio signal sequence $S_{v,1}(k)$ may be generated based on a second binary sequence $x_2(i)$ and a third binary sequence $x_3(i)$. The first radio signal sequence $S_{v,1}(k)$ may be generated based on a first intermediate sequence $\Psi_v(m)$, and the first intermediate sequence $\Psi_v(m)$ may be defined based on the second binary sequence $x_2(i)$ and the third binary sequence $x_3(i)$. The second binary sequence $x_2(i)$ and the third binary sequence $x_3(i)$ may correspond to PN sequences. For example, the first radio signal sequence $S_{v,1}(k)$ may be defined identically or similarly to Equation 2.

[Equation 2]

$$\Psi_v(m) = 1 - 2[x_2([m+v_2]_{255})) + x_3([m+v_3]_{255})]_2,\ m = 0, 1, \ldots, 2N-1$$

$$x_2(i+8) = [x_2(i+7) + x_2(i+6) + x_2(i+5) + x_2(i+2) + x_2(i+1) + x_2(i)]_2,$$

$$i = 0, 1, \ldots, (2N-1)-8$$

$$x_3(i+8) = [x_3(i+7) + x_3(i+6) + x_3(i+1) + x_3(i)]_2,$$

$$i = 0, 1, \ldots, (2N-1)-8$$

$$[00000001] = [x_2(7)\,x_2(6)\,x_2(5)\,x_2(4)\,x_2(3)\,x_2(2)\,x_2(1)\,x_2(0)]_2$$

$$[00000001] = [x_3(7)\,x_3(6)\,x_3(5)\,x_3(4)\,x_3(3)\,x_3(2)\,x_3(1)\,x_3(0)]_2$$

$$S_{v,1}(k) = \frac{1}{\sqrt{2}}(\Psi_v(2k) + j\Psi_v(2k+1)),\ k = 0, 1, \ldots, N-1$$

$$v = 0, 1, \ldots, \Xi - 1$$

$$g = \lfloor v/3 \rfloor,\ g_0 = \lfloor g/\Omega \rfloor,\ g_1 = [g]_\Omega,\ u = [v]_3$$

$$v_2 = 5(3g_0 + u),\ v_3 = g_1$$

$$v = 3g + u$$

In Equation 2, the value of N may be 127. The second binary sequence $x_2(i)$ and the third binary sequence $x_3(i)$ may be defined based on different generator polynomials having a maximum degree of 8. The second binary sequence $x_2(i)$ may be determined based on a second recursive relation $x_2(i+8)=[x_2(i+7)+x_2(i+6)+x_2(i+5)+x_2(i+2)+x_2(i+1)+x_2(i)]_2$. The third binary sequence $x_3(i)$ may be determined based on a third recursive relation $x_3(i+8)=[x_3(i+7)+x_3(i+6)+x_3(i+1)+x_3(i)]_2$. The recursive relations and numbers shown in Equation 2 are only examples for convenience of description, and the second exemplary embodiment of the radio signal generation scheme is not limited thereto. For example, the second binary sequence $x_2(i)$ and the third binary sequence $x_3(i)$ may be generated in various manners other than the recursive relations shown in Equation 2.

Theoretically, the maximum number of distinct identification indexes based on the first radio signal sequence $S_{v,1}(k)$ may be defined based on a combination of all possible cyclic shift indexes of the second binary sequence $x_2(i)$ and the third binary sequence $x_3(i)$ constituting the first radio signal sequence $S_{v,1}(k)$. Each of the cyclic shift indexes $v_2$ and $v_3$ associated with the second binary sequence $x_2(i)$ and the third binary sequence $x_3(i)$ may have a total of 255 values. Therefore, theoretically, the maximum number of identification indexes that can be distinguished based on the first radio signal sequence $S_{v,1}(k)$ may correspond to $255^2=65025$. The first radio signal sequence $S_{v,1}(k)$ may have up to 255 cyclically distinct sequences.

In Equation 2, Ξ may mean the number of distinct identification index v values. A total of Ξ identification indexes may be distinguishable by the first radio signal sequence $S_{v,1}(k)$ generated according to Equation 2. In an exemplary embodiment of the communication system, the value of the identification index v may be selected between 0 and $\Xi-1$. When v=999 is selected, g, $g_0$, $g_1$, and u may be calculated as g=333, $g_0=\lfloor \mathbf{333}/\Omega \rfloor$, $g_1=[333]_\Omega$, and u=0 based on Equation 2. In this case, the cyclic shift indexes associated with the two first binary sequences $x_2(i)$ and $x_3(i)$ may be calculated as $v_2=5(3\lfloor 333/\Omega \rfloor)$ and $v_3=[333]_\Omega$. The first radio signal sequence $S_{v,1}(k)$ may be calculated based on the values of the cyclic shift indexes $v_2$ and $v_3$ calculated as described above. Here, Ω may be calculated based on Ξ. For example, 22 may be calculated based on Ξ identically or similarly to Equation 3.

$$\Omega = (\Xi/3)/\lceil \Xi/(3\times 255) \rceil \quad \text{[Equation 3]}$$

In Equation 3, [W] may refer to the smallest integer greater than a real number [W]. When Ξ=1008, 22 May be determined as 168. Accordingly, $v_2$=30 and $v_3$=165 may be determined. When Ξ is set to twice 1008 (i.e., 2016), Ω may be determined as 224. Accordingly, $v_2$=30 and $v_3$=109 may be determined.

In Equation 2, an equation $\Psi_v(m)=1-2\,[x_2([m+v_2]_{255})+x_3([m+v_3]_{255})]_2$ for calculating the first intermediate sequence $\Psi_v(m)$ based on the second binary sequence $x_2(i)$ and the third binary sequence $x_3(i)$ may correspond to a BPSK operation. The first intermediate sequence $\Psi_v(m)$ may have a real value of 1 or −1.

One side of FIG. 6B shows an exemplary embodiment of a constellation map 620 (hereinafter, 'first intermediate constellation map') for the first intermediate sequence $\Psi_v(m)$ generated based on Equation 2 in the second exemplary embodiment of the radio signal generation scheme. The first intermediate constellation map 620 may be the same as or similar to the basic constellation map 610 described with reference to FIG. 6A.

In Equation 2, an equation $$S_{v,1}(k) = \frac{1}{\sqrt{2}}(\Psi_v(2k) + j\Psi_v(2k+1))$$

for calculating the first radio signal sequence $S_{v,1}(k)$ based on the first intermediate sequence $\Psi_v(m)$ calculated based on the BPSK operation may correspond to a QPSK operation. The first radio signal sequence $S_{v,1}(k)$ may be defined through an operation on two adjacent elements constituting the first intermediate sequence $\Psi_v(m)$. The two adjacent elements constituting the first intermediate sequence $\Psi_v(m)$ may be converted into a real part and an imaginary part. For example, an element $\Psi_v(2k)$ (hereinafter, 'even-numbered element') having an even index among the two adjacent elements constituting the first intermediate sequence $\Psi_v(m)$ may be converted into a real part, and an element $\Psi_v(2k+1)$ (hereinafter, 'odd-numbered element') having an odd index may be converted into an imaginary part. The even-numbered element $\Psi_v(2k)$ of the first intermediate sequence $\Psi_v(m)$ may be multiplied by $1/\sqrt{2}$ and converted into a real part of the first radio signal sequence $S_{v,1}(k)$. The odd-numbered element $\Psi_v(2k+1)$ of the first intermediate sequence $\Psi_v(m)$ may be multiplied by $j/\sqrt{2}$ and converted into an imaginary part of the first radio signal sequence $S_{v,1}(k)$. The first radio signal sequence $S_{v,1}(k)$ generated as described above may correspond to a complex sequence. For example, according to the values of the element $\Psi_v(2k)$ and element $\Psi_v(2k+1)$, the first radio signal sequence $S_{v,1}(k)$ may have a value of $$\frac{1}{\sqrt{2}} + \frac{j}{\sqrt{2}},\ \frac{1}{\sqrt{2}} - \frac{j}{\sqrt{2}},\ -\frac{1}{\sqrt{2}} + \frac{j}{\sqrt{2}},\ -\frac{1}{\sqrt{2}} - \frac{j}{\sqrt{2}},$$

or the like.

The other side of FIG. 6B shows the first radio signal sequence $S_{v,1}(k)$ generated based on Equation 2 in the second exemplary embodiment of the radio signal generation scheme or an exemplary embodiment of a constellation map 630 (hereinafter, 'first final constellation map') for the first radio signal generated based on the first radio signal sequence $S_{v,1}(k)$. The first radio signal may be represented with four constellation points on the first final constellation map 630. All the four constellation points corresponding to the first radio signal may have complex coordinates having a real part and an imaginary part on the complex plane.

In a second final constellation map 640 shown in FIG. 6C, a relationship between the first radio signal sequence $S_{v,1}(k)$ to which each of the four constellation points represented on the first final constellation map 630 corresponds and the first intermediate sequence $\Psi_v(m)$ is shown. In the second final constellation map 640, a constellation point '00' may correspond to a case where $\Psi_v(2k)$=1 and $\Psi_v(2k+1)$=1, a constellation point '01' may correspond to a case where $\Psi_v(2k)$)=1 and $\Psi_v(2k+1)$=−1, a constellation point '10' may correspond to a case where $\Psi_v(2k)$=−1 and $\Psi_v(2k+1)$=1, and a constellation point '11' may correspond to a case where $\Psi_v(2k)$=−1 and $\Psi_v(2k+1)$=−1. In the second final constellation map 640, a value of the first radio signal sequence $S_{v,1}(k)$ corresponding to the constellation point '00' may be $$\frac{1}{\sqrt{2}} + \frac{j}{\sqrt{2}}.$$

A value of the first radio signal sequence $S_{v,1}(k)$ corresponding to the constellation point '01' may be $$\frac{1}{\sqrt{2}} - \frac{j}{\sqrt{2}}.$$

A value of the first radio signal sequence $S_{v,1}(k)$ corresponding to the constellation point '10' may be $$-\frac{1}{\sqrt{2}} + \frac{j}{\sqrt{2}}.$$

A value of the first radio signal sequence $S_{v,1}(k)$ corresponding to the constellation point '11' may be $$-\frac{1}{\sqrt{2}} - \frac{j}{\sqrt{2}}.$$

Meanwhile, the equation for calculating the first radio signal sequence $S_{v,1}(k)$ based on the first intermediate sequence $\Psi_v(m)$ in Equation 2 may be changed to $$S_{v,1}(k) = \frac{1}{\sqrt{2}}(\Psi_v(2k) - j\Psi_v(2k+1)).$$

In this case, Equation 2 may be changed to Equation 4.

[Equation 4]

$$\Psi_v(m) = 1 - 2[x_2([m+v_2]_{255})) + x_3([m+v_3]_{255})]_2,\ m = 0, 1, \ldots, 2N-1$$

$$x_2(i+8) = [x_2(i+7) + x_2(i+6) + x_2(i+5) + x_2(i+2) + x_2(i+1) + x_2(i)]_2,$$

$$i = 0, 1, \ldots, (2N-1)-8$$

-continued $$x_3(i+8) = [x_3(i+7) + x_3(i+6) + x_3(i+1) + x_3(i)]_2,$$

$$i = 0, 1, \ldots, (2N-1) - 8$$

$$[00000001] = [x_2(7)\, x_2(6)\, x_2(5)\, x_2(4)\, x_2(3)\, x_2(2)\, x_2(1)\, x_2(0)]_2$$

$$[00000001] = [x_3(7)\, x_3(6)\, x_3(5)\, x_3(4)\, x_3(3)\, x_3(2)\, x_3(1)\, x_3(0)]_2$$

$$S_{v,1}(k) = \frac{1}{\sqrt{2}}(\Psi_v(2k) - j\Psi_v(2k+1)),\ k = 0, 1, \ldots, N-1$$

$$v = 0, 1, \ldots, \Xi - 1$$

$$g = \lfloor v/3 \rfloor,\ g_0 = \lfloor g/\Omega \rfloor,\ g_1 = [g]_\Omega,\ u = [v]_3$$

$$v_2 = 5(3g_0 + u),\ v_3 = g_1$$

$$v = 3g + u$$

FIG. 6D shows the first radio signal sequence $S_{v,1}(k)$ generated based on Equation 4 modified as described above or an exemplary embodiment of a constellation map 650 (hereinafter, 'third final constellation map) for the first radio signal generated based on the first radio signal sequence $S_{v,1}(k)$. In the third final constellation map 650, a value of the first radio signal sequence $S_{v,1}(k)$ corresponding to a constellation point '00' may be $$\frac{1}{\sqrt{2}} - \frac{j}{\sqrt{2}},$$

a value of the first radio signal sequence $S_{v,1}(k)$ corresponding to a constellation point '01' may be $$\frac{1}{\sqrt{2}} + \frac{j}{\sqrt{2}},$$

a value of the first radio signal sequence $S_{v,1}(k)$ corresponding to a constellation point '10' may be $$-\frac{1}{\sqrt{2}} - \frac{j}{\sqrt{2}},$$

and a value of the first radio signal sequence $S_{v,1}(k)$ corresponding to a constellation point '11' may be $$-\frac{1}{\sqrt{2}} + \frac{j}{\sqrt{2}}.$$

The basic radio signal sequence $S_{v,1}(k)$ generated based on Equation 1 and the first radio signal sequence $S_{v,1}(k)$ generated based on Equation 2 or Equation 4 may be compared identically or similarly to Table 4.

TABLE 4

| | Basic radio signal sequence $S_v$ (k) | First radio signal sequence $S_{v,1}$ (k) |
|---|---|---|
| Number of subcarriers (N) | 127 | 127 |
| PN sequence length | $127(=2^7-1)$ | $254(=2^8-2)$ |
| Maximum degree of PN sequence generator polynomials | 7 | 8 |
| Maximum number of cyclically distinct sequences | $127(=2^7-1)$ | $255(=2^8-1)$ |
| Maximum number of identification indexes (theoretical) | $16129(=127^2)$ | $65025(=255^2)$ |

Referring to Table 4, the number N of subcarriers to which the basic radio signal sequence $S_v(k)$ is mapped after being modulated and the number N of subcarriers to which the first radio signal sequence $S_{v,1}(k)$ is mapped after being modulated may be 127, identically. However, the maximum number of cyclically distinct sequences, 16129 and 65025, may differ by about 4 times. That is, while using the same amount of frequency resource as the first radio signal generated based on the basic radio signal sequence $S_v(k)$, the first radio signal generated based on the first radio signal sequence $S_{v,1}(k)$ may have an advantage of being able to support four times more identification indexes. In addition, since the first radio signal sequence $S_{v,1}(k)$ is generated based on cyclically distinct sequences, the cross-correlation characteristics between synchronization signal pairs generated based on the first radio signal sequence $S_{v,1}(k)$ and their variability may be maintained. In other words, the first radio signal sequence $S_{v,1}(k)$ has advantages as shown in Table 4 compared to the basic radio signal sequence $S_v(k)$, and may have excellent cross-correlation characteristics and low variability of the cross-correlation characteristics. In addition, the first radio signal generated based on the first radio signal sequence $S_{v,1}(k)$ may have an advantage of being robust against an integer multiple of a carrier frequency offset (CFO).

FIGS. 7A to 7H are conceptual diagrams for describing a third exemplary embodiment of a radio signal generation scheme in a communication system.

Referring to FIGS. 7A to 7H, a communication system may include a plurality of communication nodes. The communication system may be the same as or similar to the communication system 400 described with reference to FIG. 4. In the communication system, a second radio signal may have the same or similar structure as the first radio signal structure 500 described with reference to FIG. 5A or the second radio signal structure 550 described with reference to FIG. 5B. Hereinafter, in describing the third exemplary embodiment of the radio signal generation scheme with reference to FIGS. 7A to 7B, content overlapping those described with reference to FIGS. 1 to 6B may be omitted.

Third Exemplary Embodiment of Radio Signal Generation Scheme

In an exemplary embodiment of the communication system, the first communication node may generate the second radio signal according to the third exemplary embodiment of the radio signal generation scheme. In the third exemplary embodiment of the radio signal generation scheme, the second radio signal may be generated based on one or more second radio signal sequences. The one or more second radio signal sequences may be generated based on one or more binary sequences. The one or more second radio signal sequences may be expressed as $S_{v,2}(k)$.

In an exemplary embodiment of the communication system, the second radio signal sequence $S_{v,2}(k)$ may be generated based on a second binary sequence $x_2(i)$ and a third binary sequence $x_3(i)$. The second radio signal sequence $S_{v,2}(k)$ may be generated based on a first intermediate sequence $\Psi_v(m)$, and the first intermediate sequence $\Psi_v(m)$ may be defined based on the second binary sequence $x_2(i)$ and the third binary sequence $x_3(i)$. The second binary sequence $x_2(i)$ and the third binary sequence $x_3(i)$ may correspond to PN sequences. For example, the second radio signal sequence $S_{v,2}(k)$ may be defined identically or similarly to Equation 5.

[Equation 5]

$$\Psi_v(m) = 1 - 2[x_2([m+v_2]_{255})) + x_3([m+v_3]_{255})]_2,\ m = 0, 1, \ldots, 2N-1$$

$$x_2(i+8) = [x_2(i+7) + x_2(i+6) + x_2(i+5) + x_2(i+2) + x_2(i+1) + x_2(i)]_2,$$

$$i = 0, 1, \ldots, (2N-1) - 8$$

$$x_3(i+8) = [x_3(i+7) + x_3(i+6) + x_3(i+1) + x_3(i)]_2,$$

$$i = 0, 1, \ldots, (2N-1) - 8$$

$$[00000001] = [x_2(7)\,x_2(6)\,x_2(5)\,x_2(4)\,x_2(3)\,x_2(2)\,x_2(1)\,x_2(0)]_2$$

$$[00000001] = [x_3(7)\,x_3(6)\,x_3(5)\,x_3(4)\,x_3(3)\,x_3(2)\,x_3(1)\,x_3(0)]_2$$

$$S_{v,1}(k) = \frac{e^{\pm j\frac{\pi}{4}}}{\sqrt{2}}(\Psi_v(2k) + j\Psi_v(2k+1)) \in \{1, -1, j, -j\},\ k = 0, 1, \ldots, N-1$$

$$v = 0, 1, \ldots, \Xi - 1$$

$$g = \lfloor v/3 \rfloor,\ g_0 = \lfloor g/\Omega \rfloor,\ g_1 = [g]_\Omega,\ u = [v]_3$$

$$v_2 = 5(3g_0 + u),\ v_3 = g_1$$

$$v = 3g + u$$

Equation 5 may be partly the same as and partly different from Equation 2 described with reference to the second exemplary embodiment of the radio signal generation scheme. In Equation 5, an equation $$S_{v,2}(k) = \frac{e^{\pm j\frac{\pi}{4}}}{\sqrt{2}}(\Psi_v(2k) + j\Psi_v(2k+1))$$

for calculating the second radio signal sequence $S_{v,2}(k)$ based on the first intermediate sequence $\Psi_v(m)$ may be obtained by multiplying the equation $$S_{v,1}(k) = \frac{1}{\sqrt{2}}(\Psi_v(2k) + j\Psi_v(2k+1))$$

for calculating the first radio signal sequence $S_{v,1}(k)$ in Equation 2 with $$e^{j\frac{\pi}{4}} \text{ or } e^{-j\frac{\pi}{4}}.$$

That is, the second radio signal sequence $S_{v,2}(k)$ according to Equation 5 may correspond to a result obtained by performing a rotation transformation operation having a size of $\pi/4$ or $-\pi/4$ on the complex plane with respect to the first radio signal sequence $S_{v,1}(k)$ according to Equation 2.

Figure 7A:
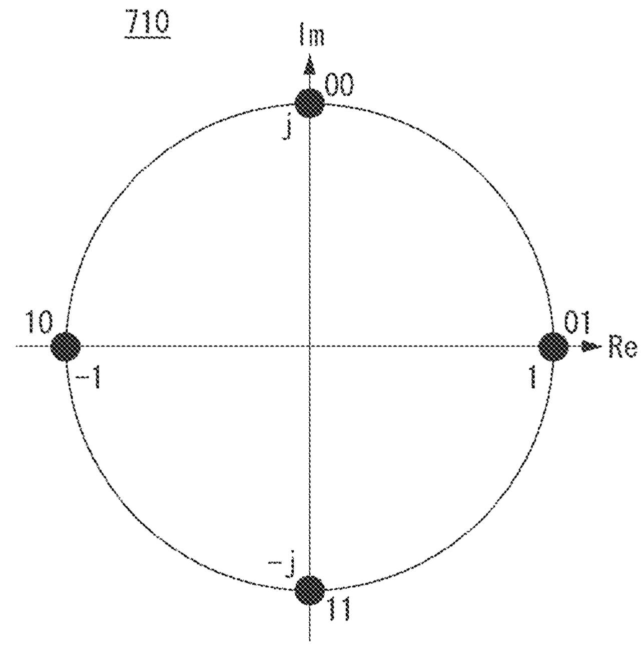
FIGS. 7A to 7H are conceptual diagrams for describing a third exemplary embodiment of a radio signal generation scheme in a communication system.
Figure 7B:
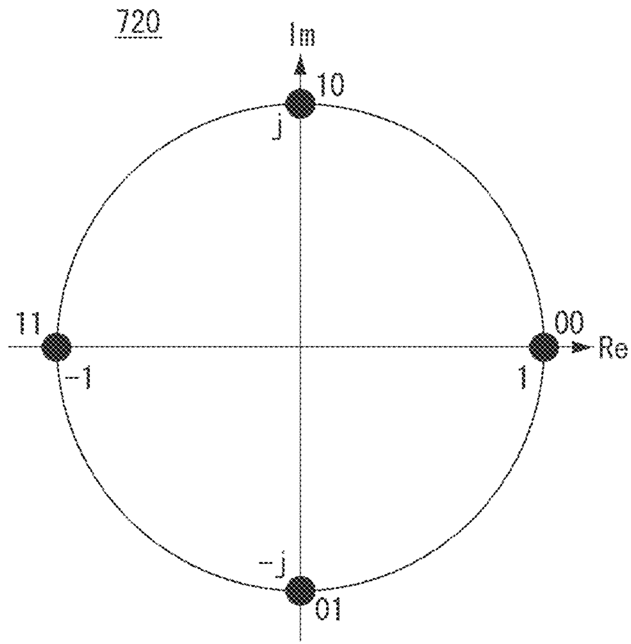

FIGS. 7A and 7B show the second radio signal sequence $S_{v,2}(k)$ generated based on Equation 5 in the third exemplary embodiment of the radio signal generation scheme or exemplary embodiments of constellation map (hereinafter, first constellation map 710 and second constellation map 720) for the second radio signal generated based on the second radio signal sequence $S_{v,2}(k)$.

The first constellation map 710 may correspond to the case of $$S_{v,2}(k) = \frac{e^{j\frac{\pi}{4}}}{\sqrt{2}}(\Psi_v(2k) + j\Psi_v(2k+1)).$$

The second radio signal may be represented with four constellation points on the first constellation map 710. All the four constellation points corresponding to the second radio signal on the first constellation map 710 may have coordinates having only real values or only imaginary values on the complex plane. In other words, all the four constellation points corresponding to the second radio signal on the first constellation 710 map may be located on the real axis or the imaginary axis on the complex plane. On the first constellation map 710, a value of the second radio signal sequence $S_{v,2}(k)$ corresponding to a constellation point '00' may be an imaginary number j, a value of the second radio signal sequence $S_{v,2}(k)$ corresponding to a constellation point '01' may be a real number 1, a value of the second radio signal sequence $S_{v,2}(k)$ corresponding to a constellation point '10' may be a real number −1, and a value of the second radio signal sequence $S_{v,2}(k)$ corresponding to a constellation point '11' may be an imaginary number −j.

The second radio signal sequence $S_{v,2}(k)$ represented with four constellation points on the first constellation 710 map shown in FIG. 7A may correspond to a result obtained by performing a rotation transformation operation having a size of $\pi/4$ on the complex plane with respect to the first radio signal sequence $S_{v,1}(k)$ defined by Equation 2. In other words, the four constellation points on the first constellation map 710 may correspond to a result obtained by shifting the four constellation points on the second final constellation map 640 shown in FIG. 6C at a rotation angle of $\pi/4$ on the complex plane.

Meanwhile, the second constellation map 720 may correspond to the case of $$S_{v,2}(k) = \frac{e^{-j\frac{\pi}{4}}}{\sqrt{2}}(\Psi_v(2k) + j\Psi_v(2k+1)).$$

The second radio signal may be represented with four constellation points on the second constellation map 720. All the four constellation points corresponding to the second radio signal on the second constellation map 720 may have coordinates having only real values or only imaginary values on the complex plane. On the second constellation 720, a value of the second radio signal sequence $S_{v,2}(k)$ corresponding to a constellation point '00' may be a real number 1, a value of the second radio signal sequence $S_{v,2}(k)$ corresponding to a constellation point '01' may be an imaginary number −j, a value of the second radio signal sequence $S_{v,2}(k)$ corresponding to a constellation point '10' may be an imaginary number j, and a value of the second radio signal sequence $S_{v,2}(k)$ corresponding to a constellation point '11' may be a real number −1.

The second radio signal sequence $S_{v,2}(k)$ represented with the four constellation points on the second constellation map 720 shown in FIG. 7B may correspond to a result obtained by performing a rotation transformation operation having a size of $-\pi/4$ on the complex plane with respect to the first radio signal sequence $S_{v,1}(k)$ defined by Equation 2. In other words, the four constellation points on the second constellation map 720 may correspond to a result obtained by shifting the four constellation points on the second final constellation map 640 shown in FIG. 6C at a rotation angle $-\pi/4$ on the complex plane.

The second radio signal sequence $S_{v,2}(k)$ described with reference to FIGS. 7A and 7B is only an example for convenience of description, and the second exemplary embodiment of the radio signal generation scheme is not limited thereto. For example, in an exemplary embodiment of the communication system, the definition of the second radio signal sequence $S_{v,2}(k)$ as in Equation 5 may be changed as in Equation 6.

$$\Psi_v(m) = 1 - 2[x_2([m+v_2]_{255})) + x_3([m+v_3]_{255})]_2, \quad m = 0, 1, \ldots, 2N-1 \qquad \text{[Equation 6]}$$

$$x_2(i+8) = [x_2(i+7) + x_2(i+6) + x_2(i+5) + x_2(i+2) + x_2(i+1) + x_2(i)]_2, \quad i = 0, 1, \ldots, (2N-1)-8$$

$$x_3(i+8) = [x_3(i+7) + x_3(i+6) + x_3(i+1) + x_3(i)]_2, \quad i = 0, 1, \ldots, (2N-1)-8$$

$$[00000001] = [x_2(7)\,x_2(6)\,x_2(5)\,x_2(4)\,x_2(3)\,x_2(2)\,x_2(1)\,x_2(0)]_2$$

$$[00000001] = [x_3(7)\,x_3(6)\,x_3(5)\,x_3(4)\,x_3(3)\,x_3(2)\,x_3(1)\,x_3(0)]_2$$

$$S_{v,2}(k) = \frac{e^{\pm j\frac{\pi}{4}}}{\sqrt{2}}(\Psi_v(2k) - j\Psi_v(2k+1)) \in \{1, -1, j, -j\}, \; k = 0, 1, \ldots, N-1$$

$$v = 0, 1, \ldots, \Xi - 1$$

$$g = \lfloor v/3 \rfloor, \; g_0 = \lfloor g/\Omega \rfloor, \; g_1 = [g]_\Omega, \; u = [v]_3$$

$$v_2 = 5(3g_0 + u), \; v_3 = g_1$$

$$v = 3g + u$$

In Equation 6, an equation $$S_{v,2}(k) = \frac{e^{\pm j\frac{\pi}{4}}}{\sqrt{2}}(\Psi_v(2k) - j\Psi_v(2k+1))$$

for calculating the second radio signal sequence $S_{v,2}(k)$ based on the first intermediate sequence $\Psi_v(m)$ may correspond to a result obtained by multiplying the equation $$S_{v,1}(k) = \frac{1}{\sqrt{2}}(\Psi_v(2k) - j\Psi_v(2k+1))$$

for calculating the first radio signal sequence $S_{v,1}(k)$ with $$e^{j\frac{\pi}{4}} \text{ or } e^{-j\frac{\pi}{4}}.$$

That is, the second radio signal sequence $S_{v,2}(k)$ according to Equation 6 may correspond to a result obtained by performing a rotation transformation operation having a size of $\pi/4$ or $-\pi/4$ on the complex plane with respect to the first radio signal sequence $S_{v,1}(k)$ according to Equation 4. Meanwhile, $$e^{\pm j\frac{\pi}{4}}$$

in Equation 5 or Equation 6, multiplied for the rotation transformation operation, may be replaced by $$e^{\pm j\frac{3\pi}{4}}.$$

In this case, with respect to the first radio signal sequence may be replaced by $S_{v,1}(k)$ according to Equation 2 or Equation 4, it can be seen that a rotation transformation of a size of $3\pi/4$ or a size of $-3\pi/4$ is performed on the complex plane.

Figure 7C:
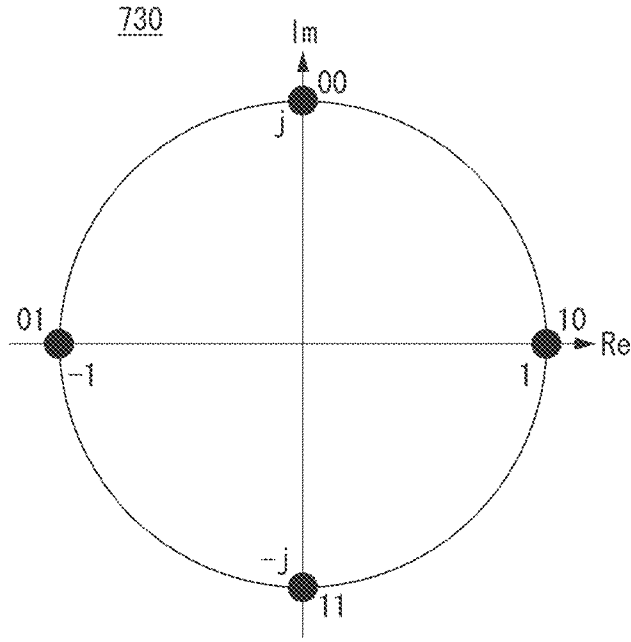

FIG. 7C shows a third exemplary embodiment of a constellation map 730 (hereinafter, third constellation map) for the second radio signal sequence $S_{v,2}(k)$ or the second radio signal. In the third constellation map 730, a value of the second radio signal sequence $S_{v,2}(k)$ corresponding to a constellation point '00' may be an imaginary number j, a value of the second radio signal sequence $S_{v,2}(k)$ corresponding to the constellation point '01' may be a real number −1, a value of the second radio signal sequence $S_{v,2}(k)$ corresponding to the constellation point '10' may be a real number 1, and a value of the second radio signal sequence $S_{v,2}(k)$ corresponding to the constellation point '11' may be an imaginary number −j.

The second radio signal sequence $S_{v,2}(k)$, which is represented with the four constellation points in the third constellation map 730 shown in FIG. 7C, may correspond to a result obtained by performing a rotation transformation operation having a size of $3\pi/4$ on the basic radio signal sequence $S_{v,1}(k)$ defined as in Equation 4 on the complex plane. In other words, the four constellation points in the third constellation map 730 may correspond to a result obtained by shifting (or rotating) the four constellation points on the third final constellation map 650 shown in FIG. 6D at a rotation angle $3\pi/4$ on the complex plane.

Figure 7D:
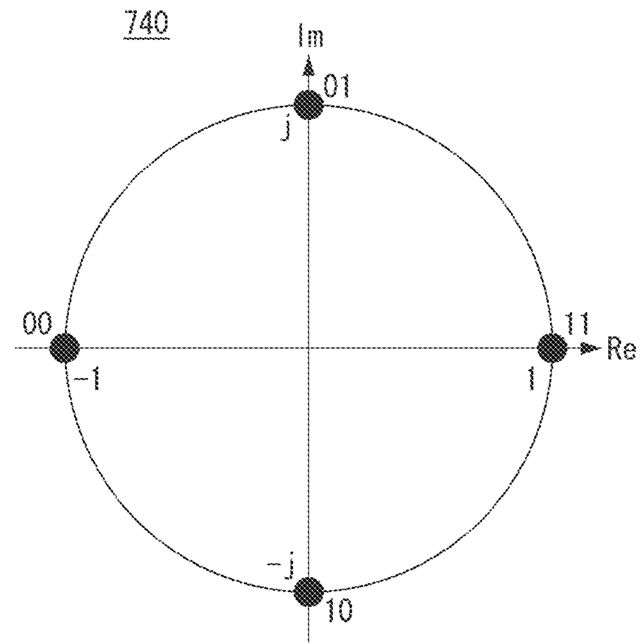

FIG. 7D shows a fourth exemplary embodiment of a constellation map 740 (hereinafter, fourth constellation map) for the second radio signal sequence $S_{v,2}(k)$ or the second radio signal. In the fourth constellation map 740, a value of the second radio signal sequence $S_{v,2}(k)$ corresponding to the constellation point '00' may be a real number 1, a value of the second radio signal sequence $S_{v,2}(k)$ corresponding to the constellation point '01' may be an imaginary number j, a value of the second radio signal sequence $S_{v,2}(k)$ corresponding to the constellation point '10' may be an imaginary number −j, and a value of the second radio signal sequence $S_{v,2}(k)$ corresponding to the constellation point '11' may be a real number −1.

The second radio signal sequence $S_{v,2}(k)$, which is represented with the four constellation points in the fourth constellation map 740 shown in FIG. 7D, may correspond to a result obtained by performing a rotation transformation operation having a size of $3\pi/4$ on the basic radio signal sequence $S_{v,1}(k)$ defined as in Equation 2. In other words, the four constellation points in the fourth constellation map 740 may correspond to a result obtained by shifting (or rotating) the four constellation points on the second final constellation map 640 shown in FIG. 6C at a rotation angle $3\pi/4$ on the complex plane.

Figure 7E:
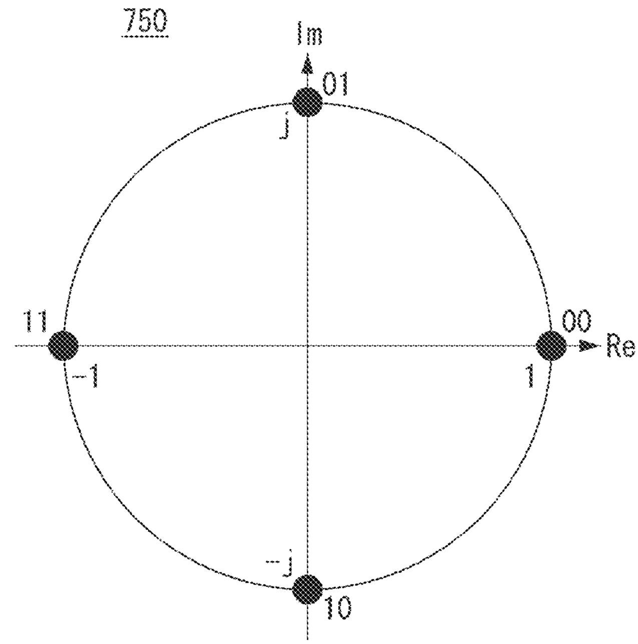

FIG. 7E shows a fifth exemplary embodiment of a constellation map 750 (hereinafter, fifth constellation map) for the second radio signal sequence $S_{v,2}(k)$ or the second radio signal. In the fifth constellation map 750, a value of the second radio signal sequence $S_{v,2}(k)$ corresponding to the constellation point '00' may be a real number 1, a value of the second radio signal sequence $S_{v,2}(k)$ corresponding to the constellation point '01' may be an imaginary number j, a value of the second radio signal sequence $S_{v,2}(k)$ corresponding to the constellation point '10' may be an imaginary number −j, and a value of the second radio signal sequence $S_{v,2}(k)$ corresponding to the constellation point '11' may be a real number −1.

The second radio signal sequence $S_{v,2}(k)$, which is represented with the four constellation points in the fifth constellation map 750 shown in FIG. 7E, may correspond to a result obtained by performing a rotation transformation operation having a size of $-\pi/4$ on the basic radio signal sequence $S_{v,1}(k)$ defined as in Equation 4. In other words, the four constellation points in the fifth constellation map 750 may correspond to a result obtained by shifting (or rotating) the four constellation points on the third final constellation map 650 shown in FIG. 6D at a rotation angle $-\pi/4$ on the complex plane.

Figure 7F:
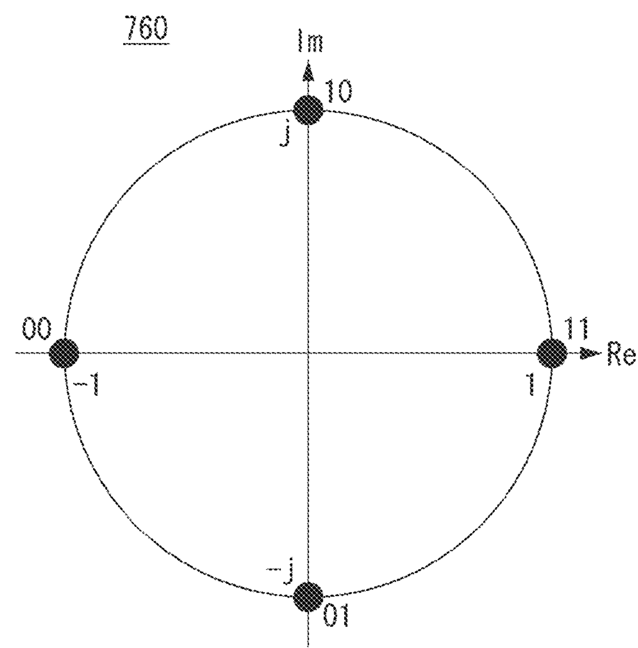

FIG. 7F shows a sixth exemplary embodiment of a constellation map 760 (hereinafter, sixth constellation map) for the second radio signal sequence $S_{v,2}(k)$ or the second radio signal. In the sixth constellation map 760, a value of the second radio signal sequence $S_{v,2}(k)$ corresponding to the constellation point '00' may be a real number −1, a value of the second radio signal sequence $S_{v,2}(k)$ corresponding to the constellation point '01' may be an imaginary number −j, a value of the second radio signal sequence $S_{v,2}(k)$ corresponding to the constellation point '10' may be an imaginary number j, and a value of the second radio signal sequence $S_{v,2}(k)$ corresponding to the constellation point '11' may be a real number 1.

The second radio signal sequence $S_{v,2}(k)$, which is represented with the four constellation points in the sixth constellation map 760 shown in FIG. 7F, may correspond to a result obtained by performing a rotation transformation operation having a size of $-3\pi/4$ on the basic radio signal sequence $S_{v,1}(k)$ defined as in Equation 4. In other words, the four constellation points in the sixth constellation map 760 may correspond to a result obtained by shifting (or rotating) the four constellation points on the third final constellation map 650 shown in FIG. 6D at a rotation angle $-3\pi/4$ on the complex plane.

Figure 7G:
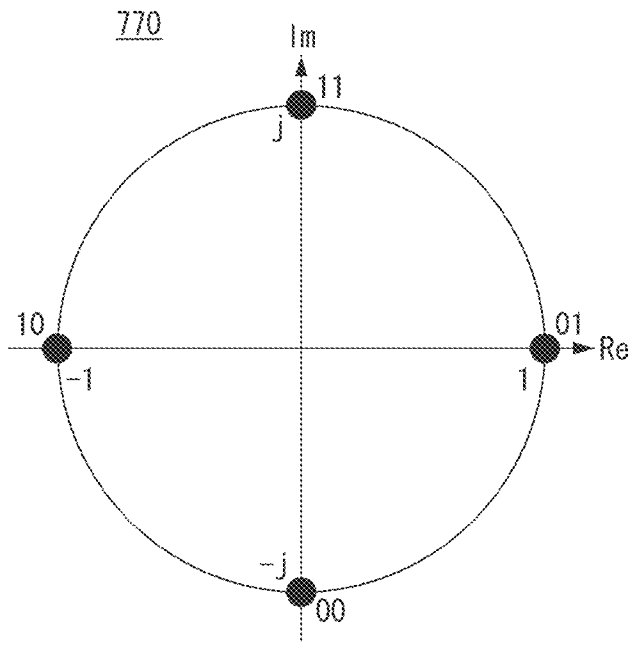

FIG. 7G shows a seventh exemplary embodiment of a constellation map 770 (hereinafter, seventh constellation map) for the second radio signal sequence $S_{v,2}(k)$ or the second radio signal. In the seventh constellation map 770, a value of the second radio signal sequence $S_{v,2}(k)$ corresponding to the constellation point '00' may be an imaginary number −j, a value of the second radio signal sequence $S_{v,2}(k)$ corresponding to the constellation point '01' may be a real number 1, a value of the second radio signal sequence $S_{v,2}(k)$ corresponding to the constellation point '10' may be a real number −1, and a value of the second radio signal sequence $S_{v,2}(k)$ corresponding to the constellation point '11' may be an imaginary number j.

The second radio signal sequence $S_{v,2}(k)$, which is represented with the four constellation points in the seventh constellation map 770 shown in FIG. 7G, may correspond to a result obtained by performing a rotation transformation operation having a size of $-\pi/4$ on the basic radio signal sequence $S_{v,1}(k)$ defined as in Equation 4. In other words, the four constellation points in the seventh constellation map 770 may correspond to a result obtained by shifting (or rotating) the four constellation points on the third final constellation map 650 shown in FIG. 6D at a rotation angle $-\pi/4$ on the complex plane.

Figure 7H:
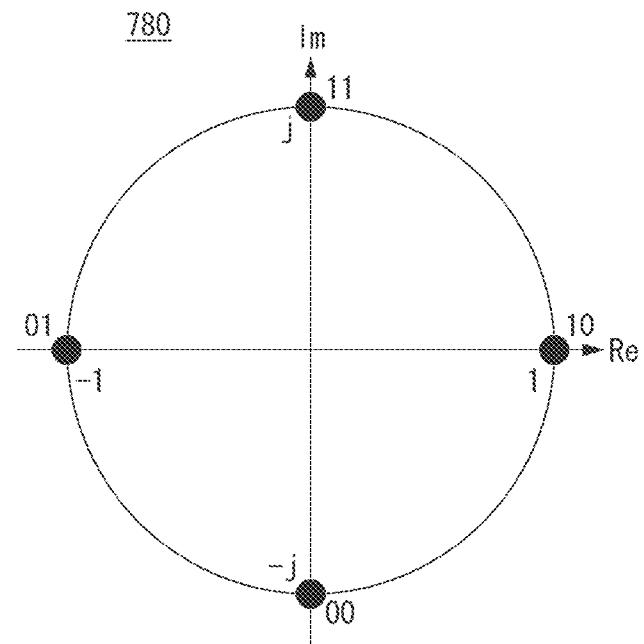

FIG. 7H shows an eighth exemplary embodiment of a constellation map 780 (hereinafter, eighth constellation map) for the second radio signal sequence $S_{v,2}(k)$ or the second radio signal. In the eighth constellation map 780, a value of the second radio signal sequence $S_{v,2}(k)$ corresponding to the constellation point '00' may be an imaginary number −j, a value of the second radio signal sequence $S_{v,2}(k)$ corresponding to the constellation point '01' may be a real number −1, a value of the second radio signal sequence $S_{v,2}(k)$ corresponding to the constellation point '10' may be a real number 1, and a value of the second radio signal sequence $S_{v,2}(k)$ corresponding to the constellation point '11' may be an imaginary number j.

The second radio signal sequence $S_{v,2}(k)$, which is represented with the four constellation points in the eighth constellation map 780 shown in FIG. 7H, may correspond to a result obtained by performing a rotation transformation operation having a size of $-3\pi/4$ on the basic radio signal sequence $S_{v,1}(k)$ defined as in Equation 2. In other words, the four constellation points in the eighth constellation map 780 may correspond to a result obtained by shifting (or rotating) the four constellation points on the second final constellation map 640 shown in FIG. 6C at a rotation angle $-3\pi/4$ on the complex plane.

In the first to eighth constellation maps 710, . . . , and 780 described with reference to FIGS. 7A to 7H, the four constellation points corresponding to the second radio signal generated according to the third exemplary embodiment of the radio signal generation scheme may all be located on the real axis or on the imaginary axis on the complex plane. The third exemplary embodiment of the radio signal generation scheme may be referred to as 'Axis QPSK (AQPSK) scheme' or 'AQPSK generation scheme'.

The first communication node may generate the second radio signal based on the second radio signal sequence $S_{v,2}(k)$ generated according to the third exemplary embodiment of the radio signal generation scheme. The first communication node may transmit the second radio signal generated based on the third exemplary embodiment of the radio signal generation scheme to the second communication node. The second communication node may receive the second radio signal. The second communication node may perform an estimation operation or identification operation based on the second radio signal. Here, the second radio signal sequence $S_{v,2}(k)$ generated according to the third exemplary embodiment of the radio signal generation scheme may have a real value (1, −1, etc.) or a pure imaginary value (j, −j, etc.). Accordingly, when the second communication node performs the estimation operation or identification operation based on the second radio signal generated according to the third exemplary embodiment of the radio signal generation scheme, complex multiplication operations may not be required. Compared to the estimation operation or identification operation based on the first radio signal generated according to the second exemplary embodiment of the radio signal generation scheme described with reference to FIGS. 6B to 6D, the required computational complexity or amount (or amount of computational resources) may be lower. That is, the performance of an estimation operation or identification operation performed by a communication node receiving a radio signal generated according to the third exemplary embodiment of the radio signal generation scheme can be improved.

In addition, the second radio signal generated according to the third exemplary embodiment of the radio signal generation scheme may have the same or similar advantages as the first radio signal generated according to the second exemplary embodiment of the radio signal generation scheme.

Fourth Exemplary Embodiment of Radio Signal Generation Scheme

In an exemplary embodiment of the communication system, the first communication node may generate a third radio signal according to the fourth exemplary embodiment of the radio signal generation scheme. In the fourth exemplary embodiment of the radio signal generation scheme, the third radio signal may be generated based on one or more third radio signal sequences. The one or more third radio signal sequences may be generated based on one or more binary sequences. The one or more third radio signal sequences may be expressed as $S_{v,3}[k]$. In an exemplary embodiment of the communication system, the third radio signal sequence $S_{v,3}(k)$ may be generated based on a fourth binary sequence $x_4(i)$, a fifth binary sequence $x_5(i)$, and a sixth binary sequence $x_6(i)$). The fourth binary sequence $x_4(i)$, the fifth binary sequence $x_5(i)$, and the sixth binary sequence $x_6(i)$ may correspond to PN sequences. For example, the third radio signal sequence $S_{v,3}[k]$ may be defined identically or similarly to Equation 7.

$$S_{v,3}[k] = 1 - 2[x_4([k+v_4]_{63}) + x_5([k+v_5]_{63}) + x_6([k+v_6]_7)]_2, \quad \text{[Equation 7]}$$

$$k = 0, 1, \ldots, N/2-1$$

$$S_{v,3}\left[k+N/2\right] = S_{v,3}[k], k = 0, 1, \ldots, N/2-1$$

$$x_4(i+6) = [x_4(i+1) + x_4(i+0)]_2, i = 0, 1, \ldots, \left(N/2-1\right)-6$$

$$x_5(i+6) = [x_5(i+5) + x_5(i+2) + x_5(i+1) + x_5(i+0)]_2,$$

$$i = 0, 1, \ldots, \left(N/2-1\right)-6$$

$$x_6(i+3) = [x_6(i+2) + x_6(i+0)]_2, i = 0, 1, \ldots, \left(\sqrt{N/2+1}-2\right)-3$$

$$[000001] = [x_4(5)\, x_4(4)\, x_4(3)\, x_4(2)\, x_4(1)\, x_4(0)]_2$$

$$[101001] = [x_5(5)\, x_5(4)\, x_5(3)\, x_5(2)\, x_5(1)\, x_5(0)]_2$$

$$[001] = [x_6(2)\, x_6(1)\, x_6(0)]_2$$

$$v = 0, 1, \ldots, \Xi-1$$

$$g = \lfloor v/3 \rfloor, g_0 = \lfloor [g]_{441}/\Omega \rfloor, g_1 = [[g]_{441}]_\Omega, \lfloor g/441 \rfloor, u[v]_3$$

$$v_4 = 5(3g_2+u), v_5 = g_1, v_6 = g_0$$

$$v = 3g+u$$

In Equation 7, the value of N may be 126 or 127. When N is 126, it may be considered that one (e.g., center subcarrier) of 127 subcarriers in the first subcarrier group described with reference to FIG. 5A is excluded from indexing. On the other hand, when N is 127, it may be considered that the center subcarrier among 127 subcarriers in the first subcarrier group is included in indexing and a value assigned to the center subcarrier is 0. A plurality of elements constituting the third radio signal sequence $S_{v,3}(k)$ defined based on Equation 7 may be divided into a first element group and a second element group based on the center subcarrier.

The fourth binary sequence $x_4(i)$ and the fifth binary sequence $x_5(i)$ may be defined based on different generator polynomials having a maximum degree of 6. The fourth binary sequence $x_4(i)$ may be determined based on a fourth recursive relation $x_4(i+6)=[x_4(i+1)+x_4(i+0)]_2$. The fifth binary sequence $x_5(i)$ may be determined based on a fifth recursive relation $x_5(i+6)=[x_5(i+5)+x_5(i+2)+x_5(i+1)+x_5(i+0)]_2$. Meanwhile, the sixth binary sequence $x_6(i)$ may be defined based on a generator polynomial having a maximum degree of 3. The sixth binary sequence $x_6(i)$ may be determined based on a sixth recursive relation $x_6(i+3)=[x_6(i+2)+x_6(i+0)]_2$. The recursive relations and numbers shown in Equation 7 are only examples for convenience of description, and the fourth exemplary embodiment of the radio signal generation scheme is not limited thereto. For example, the fourth binary sequence $x_4(i)$, the fifth binary sequence $x_5(i)$, and the sixth binary sequence $x_6(i)$ may be generated in various manners other than the recursive relations shown in Equation 7.

In an exemplary embodiment of the communication system, the N elements constituting the third radio signal sequence $S_{v,3}(k)$ may be divided into a first group and a second group. For example, the third radio signal sequence $S_{v,3}(k)$ may be generated based on the first group (or first element group) composed of N/2 elements and the second group (or second element group) composed of N/2 elements.

In an exemplary embodiment of the communication system, the first group may be denoted as $S_{v,3}[k]$ and the second group may be denoted as $S_{v,3}[k+N/2]$. In the first group $S_{v,3}[k]$ and the second group $S_{v,3}[k+N/2]$, k may have a value greater than or equal to 0 and smaller than N/2. In Equation 7, an equation $S_{v,3}[k]=1-2\ [x_4\ [k+v_4]_{63})+x_5([k+v_5]_{63})+x_6\ [k+v_6]_7)]_2$ for calculating the first group $S_{v,3}[k]$ of the third radio signal sequence $S_{v,3}(k)$ based on the fourth binary sequence $x_4(i)$, the fifth binary sequence $x_5(i)$, and the sixth binary sequence $x_6(i)$ may correspond to a BPSK operation. On the other hand, the second group $S_{v,3}[k+N/2]$ of the third radio signal sequence $S_{v,3}(k)$ may correspond to repetition of the first group $S_{v,3}[k]$. Accordingly, the third radio signal sequence $S_{v,3}(k)$ including the first and second groups may have a real value of 1 or −1. Alternatively, in an exemplary embodiment of the communication system, the first group may be determined based on the intermediate sequence $S_{v,3}[k]$. In this case, the second group may be determined based on repetition of the intermediate sequence $S_{v,3}[k]$ (i.e., $S_{v,3}[k+N/2]$).

Theoretically, the maximum number of identification indexes that can be distinguished based on the third radio signal sequence $S_{v,3}(k)$ may be defined as combinations of all possible cyclic shift indexes of the fourth binary sequence $x_4(i)$, the fifth binary sequence $x_5(i)$, and the sixth binary sequence $x_6(i)$ constituting the third radio signal sequence $S_{v,3}(k)$. Each of the cyclic shift indexes $v_4$ and $v_5$ associated with the fourth binary sequence $x_4(i)$ and the fifth binary sequence $x_5(i)$ may have a total of 63 values. The cyclic shift index $v_6$ associated with the sixth binary sequence $x_6(i)$ may have a total of 7 values. Therefore, theoretically, the maximum number of identification indexes that can be distinguished based on the third radio signal sequence $S_{v,3}(k)$ may correspond to 63×63×7=16129. The third radio signal sequence $S_{v,3}(k)$ may have up to 63 cyclically distinct sequences.

In an exemplary embodiment of the communication system, the value of the identification index v may be selected between 0 and Ξ−1. When v=999 is selected, g, $g_0$, $g_1$, $g_2$, and u may calculated as g=333, $g_0=\lfloor 333/\Omega \rfloor$, $g_1=[333]_\Omega$, $g_2=0$, and u=0 based on Equation 7. In this case, the cyclic shift indexes associated with the fourth binary sequence $x_4(i)$, the fifth binary sequence $x_5(i)$, and the sixth binary sequence $x_6(i)$ may be calculated as $v_4=0$, $v_5=[333]_\Omega$, and $v_6=\lfloor 333/\Omega \rfloor$. The third radio signal sequence $S_{v,3}(k)$ may be calculated based on the values of the cyclic shift indexes $v_4$, $v_5$, and $v_6$ calculated as described above. Here, Ω may be calculated based on Ξ. For example, 22 may be calculated based on E identically or similarly to Equation 8.

$$\Omega = (\Xi/3)/(7\times\lceil\Xi/(3\times 441)\rceil) \quad \text{[Equation 8]}$$

In Equation 8, when Ξ is set to 1008, 2 May be determined as 48. When the value of Ξ is set to twice 1008 (i.e., 2016), Ω=48 may be determined. Based on the value of Ω determined based on Equation 8, values of the cyclic shift indexes $v_4$, $v_5$, and $v_6$ may be determined. In Equations 7 and 8, 441 may correspond to a first reference value. Setting the first reference value to 441 is only an example for convenience of description, and the fourth exemplary embodiment of the radio signal generation scheme is not limited thereto.

The basic radio signal sequence $S_v(k)$ generated based on Equation 1 and the third radio signal sequence $S_{v,3}(k)$ generated based on Equation 7 may be compared identically or similarly to Table 5.

TABLE 5

| | Basic radio signal sequence $S_v$ (k) | Third radio signal sequence $S_{v,3}$ (k)) |
|---|---|---|
| Number of subcarriers (N) | 127 | 126 |
| PN sequence length | 127(=$2^7$ − 1) | 63(=$2^6$ − 1) and 7(=$2^3$ − 1) |
| Maximum degree of PN sequence generator polynomials | 7 | 6 |
| Maximum number of identification indexes (theoretical) | 16129(=$127^2$) | 27783(=63*63*7) |

Referring to Table 5, the number N of subcarriers to which the basic radio signal sequence $S_v(k)$ is mapped after being modulated may be 127, and the number N of subcarriers to which the third radio signal sequence $S_{v,3}(k)$ is mapped after being modulated may be 126. That is, the third radio signal sequence $S_{v,3}(k)$ generated according to the fourth exemplary embodiment of the radio signal generation scheme may have an advantage of being able to support identification indexes 1.72 times more than the basic radio signal sequence $S_v(k)$ while using the same amount of frequency resource or one less frequency resource. In addition, since the third radio signal sequence $S_{v,3}(k)$) is generated based on linearly distinct sequences, the cross-correlation between synchronization signal pairs generated based on the third radio signal sequence $S_{v,3}(k)$ and their variability may be maintained.

Fifth Exemplary Embodiment of Radio Signal Generation Scheme

In an exemplary embodiment of the communication system, the first communication node may generate a fourth radio signal according to a fifth exemplary embodiment of the radio signal generation scheme. In the fifth exemplary embodiment of the radio signal generation scheme, the fourth radio signal may be generated based on one or more fourth radio signal sequences. The one or more first radio signal sequences may be generated based on one or more binary sequences. The one or more fourth radio signal sequences may be expressed as $S_{v,4}(k)$.

In an exemplary embodiment of the communication system, the fourth radio signal sequence $S_{v,4}(k)$ may be generated based on a seventh binary sequence $x_7(i)$, an eighth binary sequence $x_8(i)$, and a ninth binary sequence $x_9(i)$. The fourth radio signal sequence $S_{v,4}(k)$ may be generated based on a second intermediate sequence ¿ (m), and the second intermediate sequence ((m) may be defined based on the seventh binary sequence $x_7(i)$, the eighth binary sequence $x_8(i)$, and the ninth binary sequence $x_9(i)$. The seventh binary sequence $x_7(i)$, the eighth binary sequence $x_8(i)$, and the ninth binary sequence $x_9(i)$ may correspond to PN sequences. For example, the fourth radio signal sequence $S_{v,4}(k)$ may be defined identically or similarly to Equation 9.

$$\zeta_v(m) = 1 - 2[x_7([m+v_7]_{63}) + x_8([m+v_8]_{63}) + x_9([m+v_9]_7)]_2, \quad \text{[Equation 9]}$$
$$m = 0, 1, \ldots, N/2-1$$
$$S_{v,4}(N/2-1-k) = \zeta_v(k), k = 0, 1, \ldots, N/2-1$$
$$S_{v,4}(k+N/2) = \zeta_v(k), k = 0, 1, \ldots, N/2-1$$
$$x_7(i+6) = [x_7(i+1) + x_7(i+0)]_2, i = 0, 1, \ldots, (N/2-1)-6$$
$$x_8(i+6) = [x_8(i+5) + x_8(i+2) + x_8(i+1) + x_8(i+0)]_2,$$
$$i = 0, 1, \ldots, (N/2-1)-6$$
$$x_9(i+3) = [x_9(i+2) + x_9(i+0)]_2, i = 0, 1, \ldots, \left(\sqrt{N/2+1}-2\right)-3$$
$$[000001] = [x_7(5)\, x_7(4)\, x_7(3)\, x_7(2)\, x_7(1)\, x_7(0)]_2$$
$$[101001] = [x_8(5)\, x_8(4)\, x_8(3)\, x_8(2)\, x_8(1)\, x_8(0)]_2$$
$$[001] = [x_9(2)\, x_9(1)\, x_9(0)]_2$$
$$v = 0, 1, \ldots, \Xi-1$$
$$g = \lfloor v/3 \rfloor, g_0 = \lfloor [g]_{441}/\Omega \rfloor, g_1 = [[g]_{441}]_\Omega, g_2 = \lfloor g/441 \rfloor, u = [v]_3$$
$$v_6 = 5(3g_2 + u), v_7 = g_1, v_8 = g_0$$
$$v = 3g + u$$

In Equation 9, the value of N may be 126 or 127. When N is 126, it may be considered that one (e.g., center subcarrier) of 127 subcarriers in the first subcarrier group described with reference to FIG. 5A is excluded from indexing. On the other hand, when N is 127, it may be considered that the center subcarrier among 127 subcarriers in the first subcarrier group is included in indexing and a value assigned to the center subcarrier is 0.

The seventh binary sequence $x_7(i)$ and the eighth binary sequence $x_8(i)$ may be defined based on different generator polynomials having a maximum degree of 6. The seventh binary sequence $x_7(i)$ may be determined based on a seventh recursive relation $x_7(i+6)=[x_7(i+1)+x_7(i+0)]_2$. The eighth binary sequence $x_8(i)$ may be determined based on an eighth recursive relation $x_8(i+6)=[x_8(i+5)+x_8(i+2)+x_8(i+1)+x_8(i+0)]_2$. Meanwhile, the ninth binary sequence $x_9(i)$ may be defined based on a generator polynomial having a maximum degree of 3. The ninth binary sequence $x_9(i)$ may be determined based on a ninth recursive relation $x_9(i+3)=[x_9(i+2)+x_9(i+0)]_2$. The recursive relations and numbers shown in Equation 9 are only examples for convenience of description, and the fifth exemplary embodiment of the radio signal generation scheme is not limited thereto. For example, the seventh binary sequence $x_7(i)$, the eighth binary sequence $x_8(i)$, and the ninth binary sequence $x_9(i)$ may be generated in various manners other than the recursive relations shown in Equation 9.

In Equation 9, an equation $\zeta_v(m)=1-2[x_7([m+v_7]_{63})+x_8[m+v_8]_{63})+x_9([m+v_9]_7)]_2$ for calculating the second intermediate sequence $\zeta(m)$ based on the seventh binary sequence $x_7(i)$, the eighth binary sequence $x_8(i)$, and the ninth binary sequence $x_9(i)$ may correspond to a BPSK operation. A first group $S_{v,4}(N/2-1-k)$ of the fourth radio signal sequence $S_{v,4}(k)$ may be defined as $S_{v,4}(N/2-1-k)=\zeta_v(k)$ based on the second intermediate sequence $\zeta(m)$. A second group $S_{v,4}(k+N/2)$ of the fourth radio signal sequence $S_{v,4}(k)$ may be defined as $S_{v,4}(k+N/2)=\zeta_v(k)$ based on the second intermediate sequence $\zeta(m)$. That is, the second group $S_{v,4}(k+N/2)$ of the fourth radio signal sequence $S_{v,4}(k)$ may correspond to a symmetric repetition of the first group $S_{v,4}(N/2-1-k)$. Accordingly, the fourth radio signal sequence $S_{v,4}(k)$ including the first and second groups may have a real value of 1 or −1.

In Equation 9, $\Omega$ may be calculated based on $\Xi$. $\Xi$ may mean the number of distinct identification indexes v. A total of $\Xi$ identification indexes may be identified by the fourth radio signal sequence $S_{v,4}(k)$ generated according to Equation 9. Here, $\Omega$ may be calculated based on $\Xi$ identically or similarly to Equation 8.

The fourth radio signal sequence $S_{v,4}(k)$ generated based on Equation 9 may have the same or similar advantages as the third radio signal sequence $S_{v,3}(k)$ described with reference to Table 5. That is, the fourth radio signal sequence $S_{v,4}(k)$ generated according to the fifth exemplary embodiment of the radio signal generation scheme may have an advantage of being able to support identification indexes about 1.72 times more than the basic radio signal sequence $S_v(k)$ while using the same amount of frequency resource or one less frequency resource.

Meanwhile, as the fourth radio signal sequence $S_{v,4}(k)$ is defined as in Equation 9, a time domain signal $S_{v,4}[n]$ of the fourth radio signal sequence $S_{v,4}(k)$ may be determined as in Equation 10.

[Equation 10]

$$\begin{aligned} s_{v,4}[n] &= \sum_{k=0}^{N/2}\left\{S_{v,4}\left(k+\frac{N}{2}\right)e^{j\frac{2\pi nk}{N}} + S_{v,4}\left(\frac{N}{2}-k\right)e^{-j\frac{2\pi nk}{N}}\right\} \\ &= \sum_{k=0}^{N/2}\left\{\left\{S_{v,4}\left(k+\frac{N}{2}\right)+S_{v,4}\left(\frac{N}{2}-k\right)\right\}\cos\left(\frac{2\pi nk}{N}\right) + j\left\{S_{v,4}\left(k+\frac{N}{2}\right)-S_{v,4}\left(\frac{N}{2}-k\right)\right\}\sin\left(\frac{2\pi nk}{N}\right)\right\} \\ &= \sum_{k=0}^{N/2}\left\{2S_{v,4}\left(k+\frac{N}{2}\right)\cos\left(\frac{2\pi nk}{N}\right)\right\} \end{aligned}$$

Referring to the time domain signal $S_{v,4}[n]$ of the fourth radio signal sequence $S_{v,4}(k)$ expressed as in Equation 10, the signal $S_{v,4}[n]$ may have only real components in the time domain. The first communication node transmitting the fourth radio signal may transmit only the real part when transmitting the fourth radio signal. Due to this, transmission complexity of the fourth radio signal may be reduced.

According to an exemplary embodiment of a method and an apparatus for radio signal transmission and reception in a communication system, performance of an estimation operation or identification operation based on a radio signal transmitted and received between a transmitting node and a receiving node can be improved. The radio signal according to an exemplary embodiment of the method and apparatus for radio signal transmission and reception in the communication system can support classification of more identification indexes while using the same amount of frequency resource. Using the radio signal according to an exemplary embodiment of the method and apparatus for radio signal transmission and reception in the communication system, computational complexity for the estimation operation or identification operation can be reduced. The radio signal according to an exemplary embodiment of the method and apparatus for radio signal transmission and reception in the communication system can have lower transmission complexity while using the same amount of frequency resource.

However, the effects that can be achieved by the radio signal transmission and reception method and apparatus in the communication system according to the exemplary embodiments of the present disclosure are not limited to those mentioned above, and other effects not mentioned may be clearly understood by those of ordinary skill in the art to which the present disclosure belongs from the configurations described in the present disclosure.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

The invention claimed is:

1. An operation method of a first communication node in a communication system, the operation method comprising:

generating first and second binary sequences composed of 2N elements;

generating a first intermediate sequence composed of 2N elements based on the first and second binary sequences and a binary phase shift keying (BPSK) operation;

generating a first signal sequence composed of N elements based on an operation on the 2N elements constituting the first intermediate sequence;

mapping first modulation symbols to N subcarriers, wherein the first modulation symbols are defined by modulating the first signal sequence; and transmitting a first signal composed of the mapped first modulation symbols, wherein the first and second binary sequences are generated based on generator polynomials having a maximum degree of (p+1) and a first identifier for the first communication node, p is a natural number, and N is a natural number having a value of $(2^P-1)$.

2. The operation method according to claim 1, wherein generating the first intermediate sequence comprises:

generating first and second cyclic shift indexes based on the first identifier;

applying the first cyclic shift index to the first binary sequence;

applying the second cyclic shift index to the second binary sequence;

performing the BPSK operation on a sum of the first and second binary sequences to which the first and second cyclic shift indexes are applied; and obtaining the first intermediate sequence corresponding to a result of the BPSK operation.

3. The operation method according to claim 1, wherein generating the first signal sequence comprises:

multiplying 2k-th elements among the 2N elements constituting the first intermediate sequence by a first coefficient that is a real number;

multiplying (2k+1)-th elements among the 2N elements constituting the first intermediate sequence by a second coefficient that is a pure imaginary number;

performing a sum operation on the 2k-th elements multiplied by the first coefficient and the (2k+1)-th elements multiplied by the second coefficient; and obtaining k-th elements of the first signal sequence based on a result of the sum operation, wherein k is an integer equal to or greater than 0 and less than N.

4. The operation method according to claim 1, wherein generating the first signal sequence comprises:

multiplying 2k-th elements among the 2N elements constituting the first intermediate sequence by a first coefficient that is a real number;

multiplying (2k+1)-th elements among the 2N elements constituting the first intermediate sequence by a second coefficient that is a pure imaginary number;

performing a sum operation on the 2k-th elements multiplied by the first coefficient and the (2k+1)-th elements multiplied by the second coefficient;

performing a rotation transformation operation on a result of the sum operation at a first angle on a complex plane; and obtaining k-th elements of the first signal sequence based on a result of the rotation transformation operation, wherein k is an integer equal to or greater than 0 and less than N.

5. The operation method according to claim 4, wherein the first angle is one of $\pi/4$, $-\pi/4$, $3\pi/4$, or $-3\pi/4$.

6. The operation method according to claim 1, wherein the first signal supports up to $(2N+1)^2$ distinct values for the first identifier.

7. An operation method of a first communication node in a communication system, the operation method comprising:

generating first and second binary sequences composed of (N/2) elements, and a third binary sequence composed of M elements;

generating a first intermediate sequence composed of (N/2) elements based on the first to third binary sequences and a binary phase shift keying (BPSK) operation;

generating first and second element groups each composed of (N/2) elements based on the first intermediate sequence;

generating a first signal sequence composed of N elements based on the first and second element groups;

mapping first modulation symbols to N subcarriers, wherein the first modulation symbols are defined by modulating the first signal sequence; and transmitting a first signal composed of the mapped first modulation symbols, wherein the first and second binary sequences are generated based on generator polynomials having a maximum degree of (p−1), first to third cyclic shift indexes determined based on a first identifier for the first communication node are applied to the first to third binary sequences, respectively, p is a natural number, N is a natural number having a value of $(2^P-2)$, and M is a natural number less than or equal to (N/2).

8. The operation method according to claim 7, wherein generating the first intermediate sequence comprises:

determining the first to third cyclic shift indexes based on the first identifier;

applying the first cyclic shift index to the first binary sequence;

applying the second cyclic shift index to the second binary sequence;

applying the third cyclic shift index to the third binary sequence;

performing the BPSK operation on a sum of the first to third binary sequences to which the first to third cyclic shift indexes are applied; and obtaining the first intermediate sequence corresponding to a result of the BPSK operation.

9. The operation method according to claim 8, wherein determining the first to third cyclic shift indexes comprises:

determining a first variable g based on a value of the first identifier;

determining a second variable Ω based on a number of possible values of the first identifier; and determining the first to third cyclic shift indexes based on the first variable g, the second variable Ω, a first reference value t, and one or more modulo operations, wherein g, Ω, and t are natural numbers.

10. The operation method according to claim 9, wherein the second cyclic shift index is determined based on a t-modulo operation and a Ω-modulo operation for the first variable g.

11. The operation method according to claim 8, wherein the first signal supports up to (M×N×N) distinct values for the first identifier.

12. The operation method according to claim 7, wherein the (N/2) elements constituting the first element group are represented as k-th elements, the (N/2) elements constituting the second element group are represented as (N/2+k)-th elements, and the generating of the first and second element groups comprises:

obtaining the k-th elements of the first element group based on k-th elements among the (N/2) elements constituting the first intermediate sequence; and obtaining the (N/2+k)-th elements of the second element group based on k-th elements among the (N/2) elements constituting the first intermediate sequence, wherein the N elements constituting the first signal sequence include the (N/2) elements constituting the first element group and the (N/2) elements constituting the second element group, and k is an integer greater than or equal to 0 and less than (N/2).

13. The operation method according to claim 7, wherein the (N/2) elements constituting the first element group are represented as (N/2−1−k)-th elements, the (N/2) elements constituting the second element group are represented as (N/2+k)-th elements, and the generating of the first and second element groups comprises:

obtaining the (N/2−1-k)-th elements of the first element group based on k-th elements among the (N/2) elements constituting the first intermediate sequence; and obtaining the (N/2+k)-th elements of the second element group based on the k-th elements among the (N/2) elements constituting the first intermediate sequence, wherein the N elements constituting the first signal sequence include the (N/2) elements constituting the first element group and the (N/2) elements constituting the second element group, and k is an integer greater than or equal to 0 and less than (N/2).

14. The operation method according to claim 13, wherein the first modulation symbols mapped to the N subcarriers form a centrally symmetrical structure around a first reference subcarrier of the N subcarriers.

15. The operation method according to claim 13, wherein the first signal has only real components in time domain.

16. A first communication node in a communication system, comprising a processor, wherein the processor causes the first communication node to perform:

generating first and second binary sequences composed of (N/2) elements, and a third binary sequence composed of M elements;

generating a first intermediate sequence composed of (N/2) elements based on the first to third binary sequences and a binary phase shift keying (BPSK) operation;

generating first and second element groups each composed of (N/2) elements based on the first intermediate sequence;

generating a first signal sequence composed of N elements based on the first and second element groups;

mapping first modulation symbols to N subcarriers, wherein the first modulation symbols are defined by modulating the first signal sequence; and transmitting a first signal composed of the mapped first modulation symbols, wherein the first and second binary sequences are generated based on generator polynomials having a maximum degree of (p−1), first to third cyclic shift indexes determined based on a first identifier for the first communication node are applied to the first to third binary sequences, respectively, p is a natural number, N is a natural number having a value of ($2^P$−2), and M is a natural number less than or equal to (N/2).

17. The first communication node according to claim 16, wherein for generating the first intermediate sequence, the processor further causes the first communication node to perform:

determining the first to third cyclic shift indexes based on the first identifier;

applying the first cyclic shift index to the first binary sequence;

applying the second cyclic shift index to the second binary sequence;

applying the third cyclic shift index to the third binary sequence;

performing the BPSK operation on a sum of the first to third binary sequences to which the first to third cyclic shift indexes are applied; and obtaining the first intermediate sequence corresponding to a result of the BPSK operation.

18. The first communication node according to claim 17, wherein for determining the first to third cyclic shift indexes, the processor further causes the first communication node to perform:

determining a first variable g based on a value of the first identifier;

determining a second variable Ω based on a number of possible values of the first identifier; and determining the first to third cyclic shift indexes based on the first variable g, the second variable Ω, a first reference value t, and one or more modulo operations, wherein g, Ω, and t are natural numbers.

19. The first communication node according to claim 18, wherein the second cyclic shift index is determined based on a t-modulo operation and a Ω-modulo operation for the first variable g.

20. The first communication node according to claim 19, wherein the first signal supports up to (M×N×N) distinct values for the first identifier.

* * * * *